US006993198B2

United States Patent
Kishi

(10) Patent No.: US 6,993,198 B2
(45) Date of Patent: Jan. 31, 2006

(54) ENCODING APPARATUS AND ENCODING METHOD

(75) Inventor: Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 09/842,155

(22) Filed: Apr. 26, 2001

(65) Prior Publication Data

US 2001/0036321 A1 Nov. 1, 2001

(30) Foreign Application Priority Data

Apr. 27, 2000 (JP) ........................................ 2000-128515
Apr. 17, 2001 (JP) ........................................ 2001-118348

(51) Int. Cl.
*G06K 9/36* (2006.01)

(52) U.S. Cl. ............... 382/240; 375/240.19; 348/423.1; 382/236

(58) Field of Classification Search ................. 382/232, 382/233, 236, 240; 375/240.19, 240.25; 348/423.1, 348/462, 484

See application file for complete search history.

(56) References Cited

U.S. PATENT DOCUMENTS 5,715,356 A * 2/1998 Hirayama et al. ............ 386/96
6,259,735 B1 * 7/2001 Aono et al. ............. 375/240.11
6,446,037 B1 * 9/2002 Fielder et al. ............... 704/229

OTHER PUBLICATIONS

Kudumakis et al., Wavelet Packet Based Scalable Audio Coding, IEEE International Symposium on Circuits and Systems, 1996, ISCAS '96, 'Connecting the World', vol. 2, pp. 41–44.*
U.S. Appl. No. 09/702,764, filed Nov. 1, 2000.
U.S. Appl. No. 09/793,538, filed Feb. 27, 2001.
U.S. Appl. No. 09/818,560, filed Mar. 28, 2001.
U.S. Appl. No. 09/851,559, May 10, 2001.

* cited by examiner

*Primary Examiner*—Yon J. Couso
(74) *Attorney, Agent, or Firm*—Fitzpatrick, Cella, Harper & Scinto

(57) ABSTRACT

In this invention, when frame encoded data is to be generated on the basis of data obtained by separating image data and sound data contained in frame data of a motion image and hierarchically encoding both the data, frequency sub-bands of the same significance level in the hierarchically image encoded data and sound data are grouped, and frame encoded data is generated by arranging these groups in descending order of significance level. This makes it possible to appropriately give scalability to both the image data and sound data already hierarchically encoded, without decoding them, and generate encoded data containing both the data. Since encoded data of image data and sound data can be transmitted by grouping them in appropriate units, the receiving side can efficiently utilize the encoded data.

32 Claims, 28 Drawing Sheets

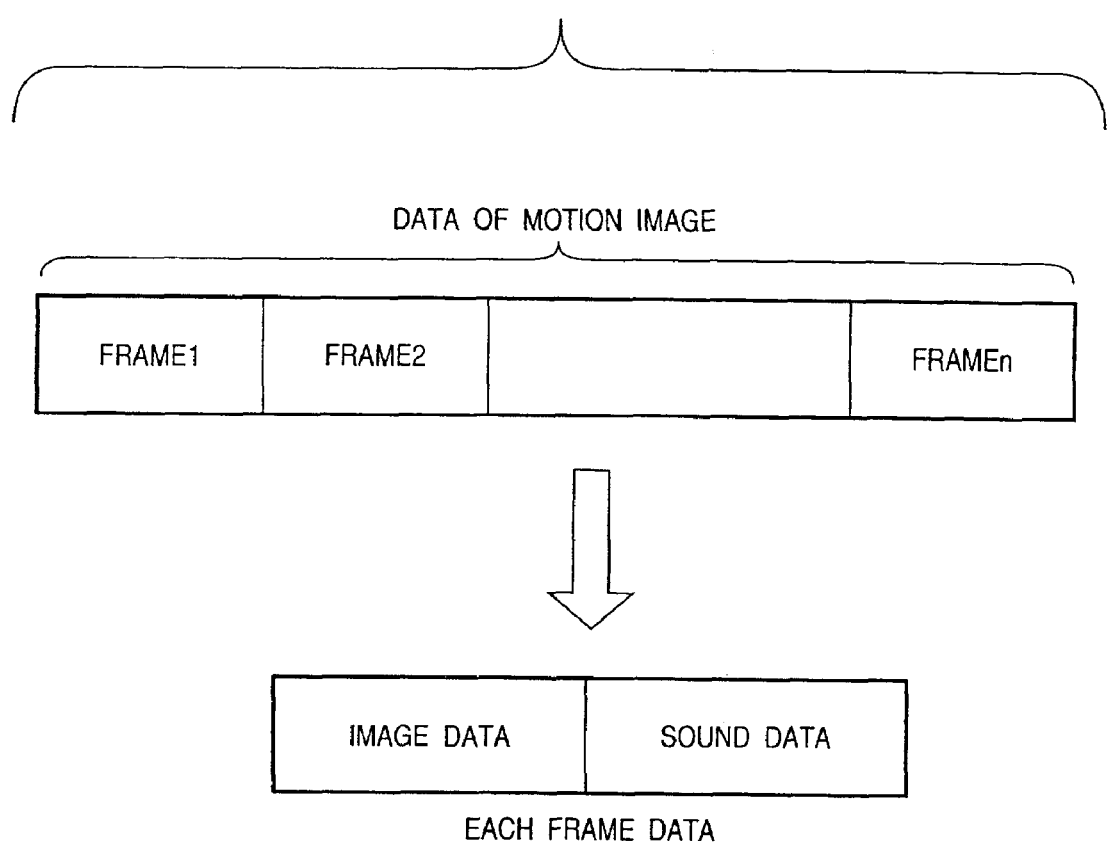

FIG. 3
FRAME DATA
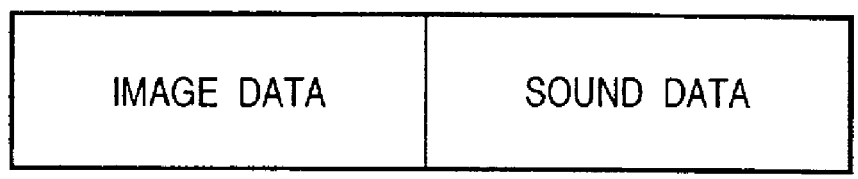
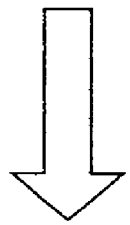
SEPARATED BY FRAME DATA SEPARATOR 104
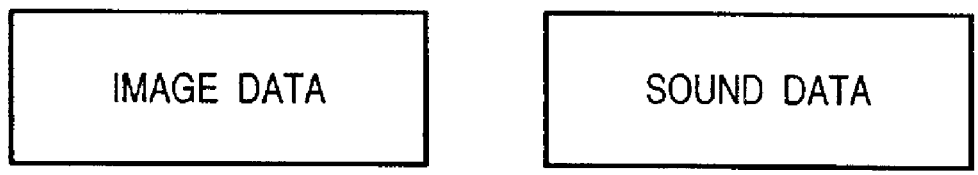

FRAME ENCODED DATA

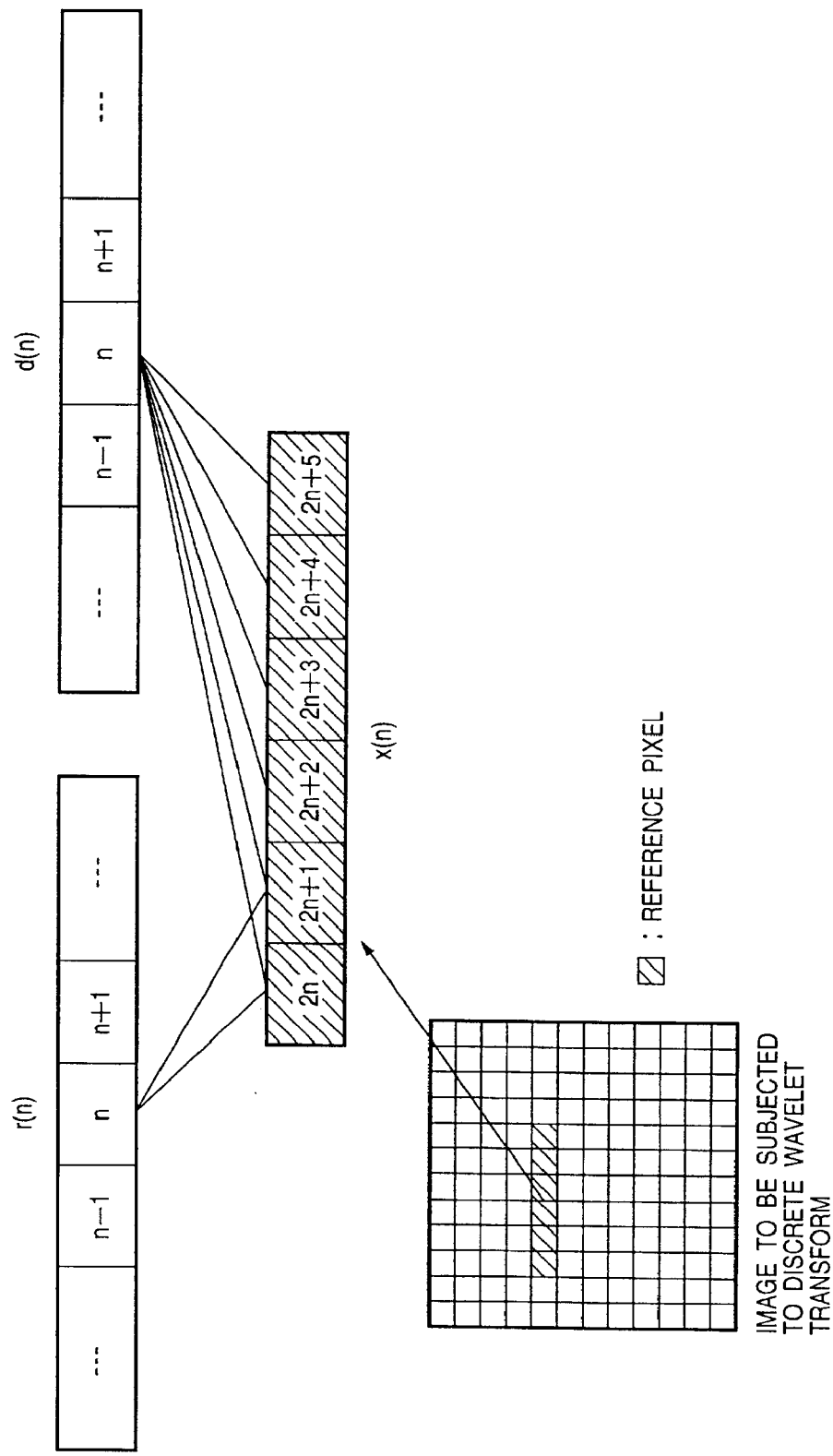

FIG. 6A

| LL | HL |
|---|---|
| LH | HH |

FIG. 6B

| LL \| HL | HL | |
|---|---|---|
| LH \| HH | | |
| LH | HH | |

(Arrangement: top-left quadrant subdivided into LL, HL, LH, HH; right half is HL; bottom-left is LH; bottom-right is HH)

FIG. 6C

(Top-left quadrant subdivided: innermost LL, HL1, LH1, HH1; next level HL2, HH2, LH2; outer HL3, LH3, HH3)

LEVEL0 : LL
LEVEL1 : HL1,HH1,LH1
LEVEL2 : HL2,HH2,LH2
LEVEL3 : HL3,HH3,LH3

FIG. 7

| FREQUENCY COMPONENT | QUANTIZATION STEP |
|---|---|
| LL | 1 |
| HL1 | 2 |
| HH1 | 2 |
| LH1 | 2 |
| HL2 | 4 |
| HH2 | 4 |
| LH2 | 4 |
| HL3 | 8 |
| HH3 | 8 |
| LH3 | 8 |

IMAGE ENCODED DATA

LEVEL0 : L    LEVEL1 : H1    LEVEL2 : H2    LEVEL3 : H3

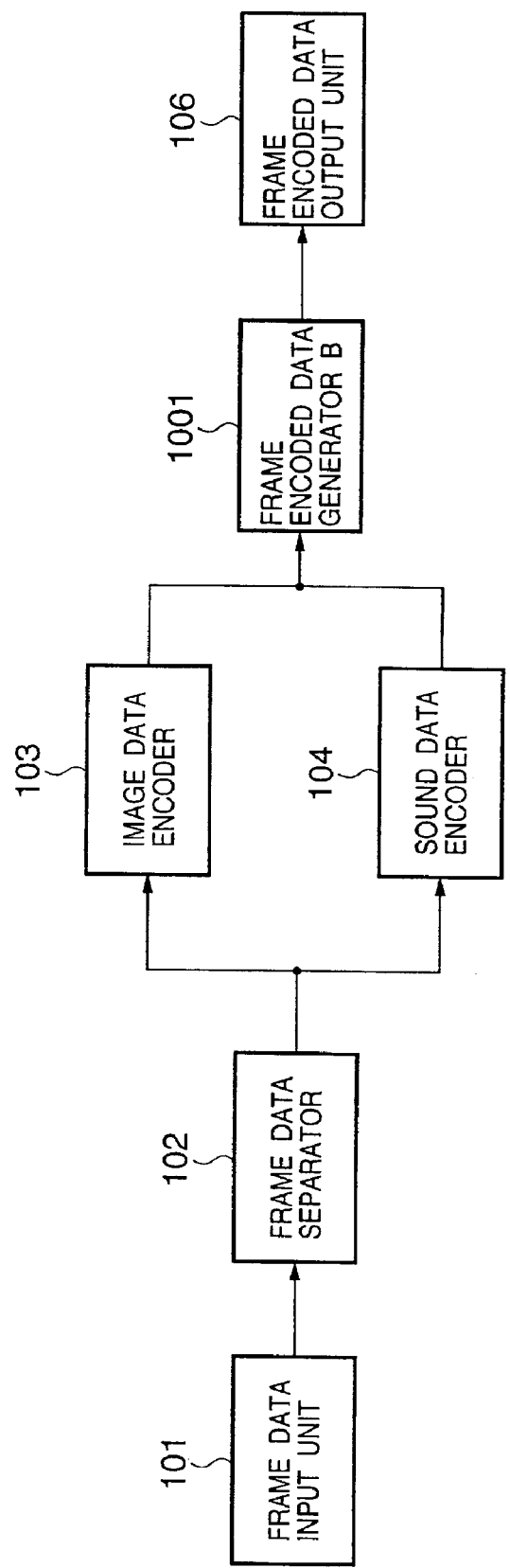

ENCODING APPARATUS AND ENCODING METHOD

FIELD OF THE INVENTION

The present invention relates to an encoding apparatus and encoding method of encoding frame data containing image data and sound data.

BACKGROUND OF THE INVENTION

With the recent spread of personal computers and mobile terminals, digital data communication (data communication) is beginning to be widely performed across the Internet. One digital data circulated in data communication is a motion image. Since a motion image generally has a large data amount, the transmission data amount is reduced before transmission by encoding the motion image by using still images contained in the motion image and sounds attached to these still images as units.

One known motion image data communication method of this type is a method by which transmission data is given characteristics (scalability) which, as decoding of image data and sound data contained in motion image data is advanced on the receiving side, improve the quality of the decoded image or decoded sound.

To give scalability to data to be transmitted as described above, scalability is given when image data and sound data to be transmitted are encoded.

In the above conventional communication method using scalability, however, scalability is given to transmission data when the data is encoded. Therefore, to give scalability to image and sound data already encoded, it is necessary to once decode these data and again encode the data to give scalability to them.

Also, no encoding method capable of generating encoded data containing both image data and sound data while giving scalability to both the data has been established.

SUMMARY OF THE INVENTION

The present invention has been proposed to solve the conventional problems, and has as its object to provide an image encoding apparatus and image encoding method of appropriately giving scalability to both image data and sound data already encoded, without decoding them, and thereby generating encoded data containing both the data.

According to the present invention, the foregoing object is attained by providing an encoding apparatus for encoding frame data containing image data and sound data, comprising: separating means for separating the image data and sound data contained in the frame data; image data encoding means for encoding the separated image data in sequence from a lower to a higher frequency component thereof, thereby generating image encoded data; sound data encoding means for encoding the separated sound data in sequence from a lower to a higher frequency component thereof, thereby generating sound encoded data; and frame encoded data generating means for generating header information by using the image encoded data and the sound encoded data, and generating frame encoded data by using the header information, the image encoded data, and the sound encoded data.

In accordance with the present invention as described above, it is possible to generate frame encoded data by hierarchically encoding both image data and sound data in units of frequency components.

It is another object of the present invention to provide an encoding apparatus and encoding method capable of generating and transmitting encoded data by grouping image data and sound data in each frame of a motion image in appropriate units, thereby allowing efficient utilization of the encoded data on the receiving side.

According to the present invention, the foregoing object is attained by providing an encoding apparatus for encoding frame data containing image data and sound data, comprising: separating means for separating the image data and the sound data contained in the frame data; image data encoding means for hierarchizing the image data into a plurality of types of image data and encoding the plurality of types of image data, thereby generating image encoded data corresponding to a plurality of levels; sound data encoding means for hierarchizing the sound data into a plurality of types of sound data and encoding the plurality of types of sound data, thereby generating sound encoded data corresponding to a plurality of levels; and frame encoded data generating means for generating frame encoded data by using the image encoded data and the sound encoded data, wherein said frame encoded data generating means generates the frame encoded data by forming a plurality of groups of different levels by grouping the image encoded data and sound encoded data belonging to the same level determined on the basis of a predetermined reference, and arranging the plurality of groups in descending order of significance level.

In accordance with the present invention as described above, groups of image encoded data and sound encoded data can be transmitted in descending order of significance level.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing the structure of frame data;

FIG. 3 is a view for explaining separation of frame data into image data and sound data;

FIG. 5 is a view schematically showing discrete wavelet transform;

FIGS. 6A to 6C are views showing subbands generated by discrete wavelet transform;

FIG. 7 is a view showing the correspondence between frequency components and quantization steps in the first embodiment;

FIG. 10 is a block diagram showing the arrangement of an encoding apparatus according to the second embodiment;

DETAILED DESCRIPTION OF THE PREFERRED EMBODIMENTS

Preferred embodiments of the present invention will now be described in detail in accordance with the accompanying drawings.

In each embodiment to be described below, assume that a motion image to be encoded is composed of a plurality of frames. Frames are still images to be displayed in turn to permit man to visually perceive a motion image. A sound is attached to each still image and reproduced in a period (display period) during which the image is displayed. That is, data of one frame (frame data) is composed of data (image data) of one still image and data (sound data) of a sound. Also, generating frame encoded data by encoding frame data is equivalent to generating image encoded data and sound encoded data by encoding image data and sound data, respectively.

An apparatus (frame decoding apparatus) for decoding frame encoded data is sometimes unable to completely decode (complete decoding) one frame encoded data during a display period, because of insufficient capability of a CPU or the like. Under the circumstances, partial decoding by which portions of image encoded data and sound encoded data are decoded is performed. In the following description, an image obtained by partial decoding of image encoded data will be referred to as a partial decoded image, and a sound obtained by partial decoding of sound encoded data will be referred to as a partial decoded sound. Likewise, an image obtained by complete decoding of image encoded data will be referred to as a complete decoded image, and a sound obtained by complete decoding of sound encoded data will be referred to as a complete decoded sound.

In partial decoding of image encoded data, a rough shape of a complete decoded image must be displayed even if the image quality is low.

In partial decoding of sound encoded data, a rough sound of a complete decoded sound is desirably reconstructed to the extent which corresponds to the quality of a partial decoded image.

Rough display of a complete decoded image and rough reconstruction of a complete decoded sound are achieved by performing discrete wavelet transform for image data and sound data and encoding the data by giving scalability to them.

As described above, the object of the present invention is to encode image data and sound data so that both the data have scalability, thereby generating frame encoded data by various methods.

The present invention will be described below in accordance with its preferred embodiments with reference to the accompanying drawings.

<First Embodiment>

§ Arrangement of Encoding Apparatus

Figure 1A:
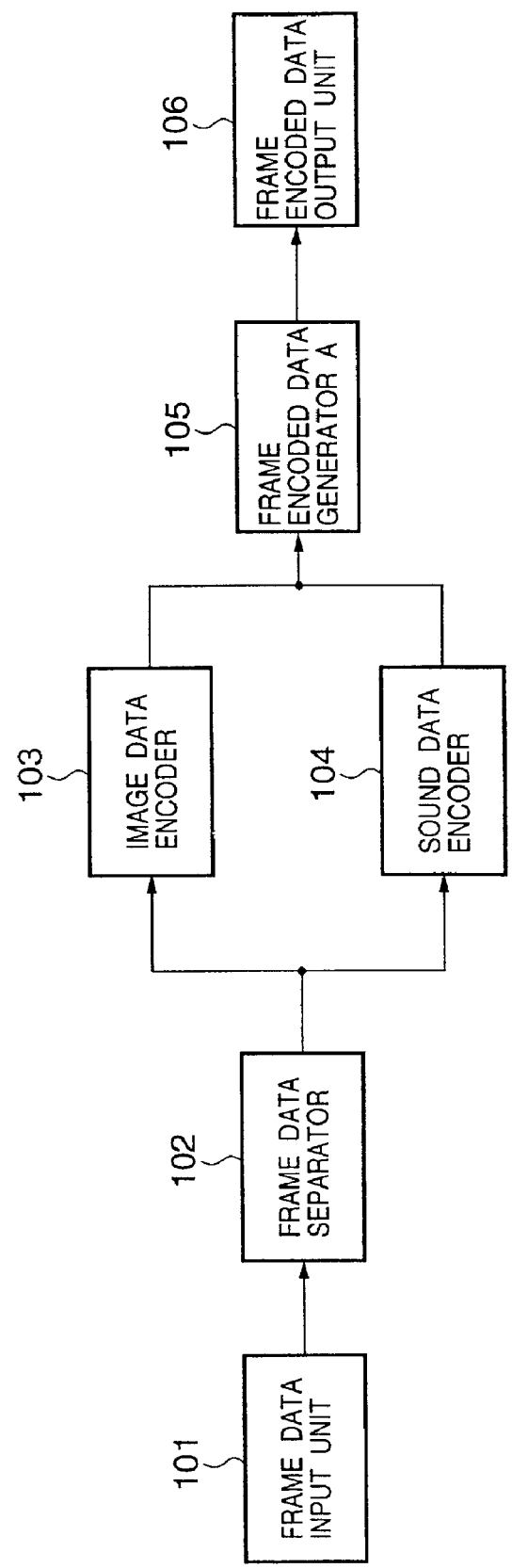
FIG. 1A is a block diagram showing the arrangement of an encoding apparatus according to the first embodiment of the present invention.

FIG. 1A is a block diagram showing the arrangement of an encoding apparatus according to this embodiment. In FIG. 1A, reference numeral 101 denotes a frame data input unit; 102, a frame data separator; 103, an image data encoder; 104, a sound data encoder; 105, a frame encoded data generator A; and 106, a frame encoded data output unit.

Figure 1B:
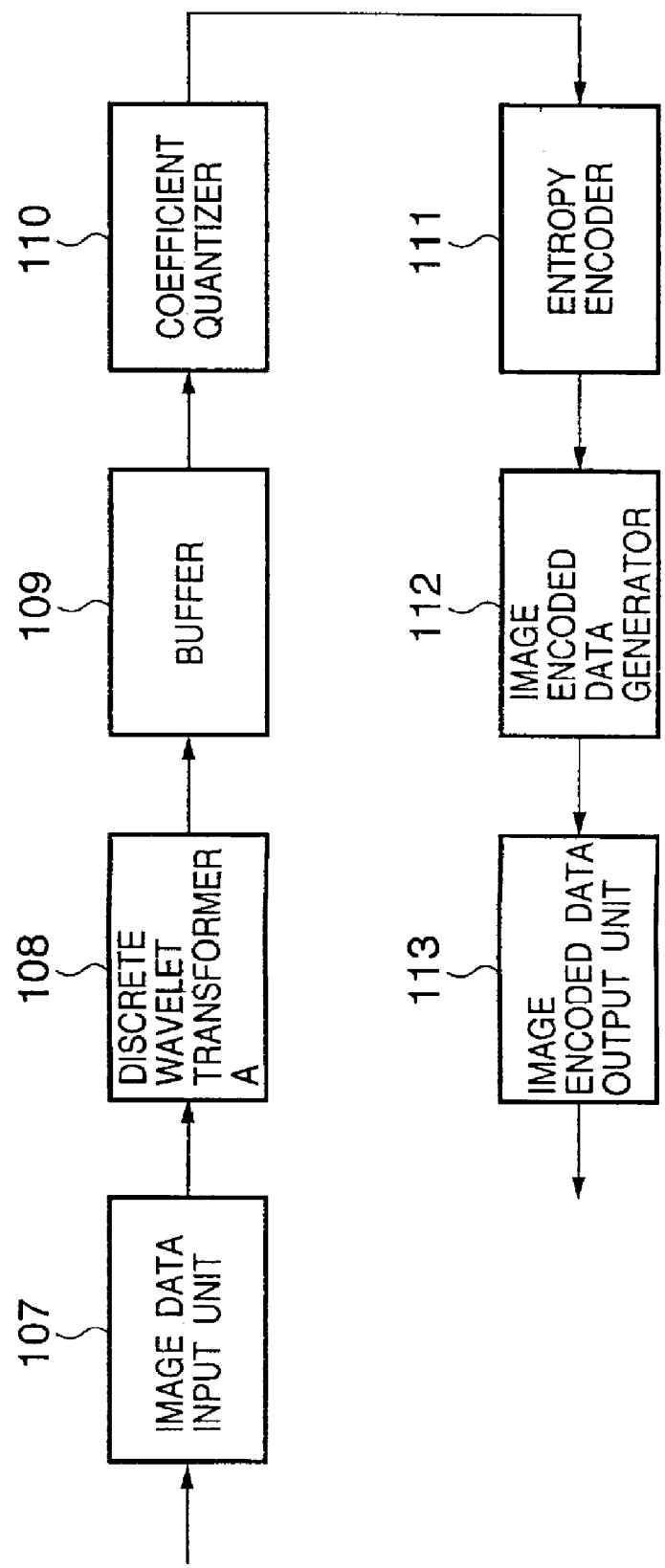
FIG. 1B is a block diagram showing the arrangement of an image data encoder 103.

FIG. 1B is a block diagram showing the arrangement of the image data encoder 103 shown in FIG. 1A. In FIG. 1B, reference numeral 107 denotes an image data input unit; 108, a discrete wavelet transformer A; 109, a buffer; 110, a coefficient quantizer; 111, an entropy encoder; 112, an image encoded data generator A; and 113, an image encoded data output unit.

Figure 1C:
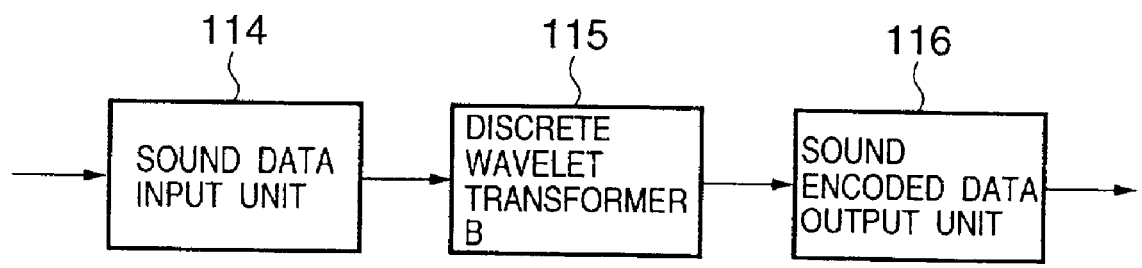
FIG. 1C is a block diagram showing the arrangement of a sound data encoder 104.

FIG. 1C is a block diagram showing the arrangement of the sound data encoder 104 shown in FIG. 1A. In FIG. 1C, reference numeral 114 denotes a sound data input unit; 115, a discrete wavelet transformer B; and 116, a sound encoded data output unit.

§ Frame Encoding Process

Figure 14:
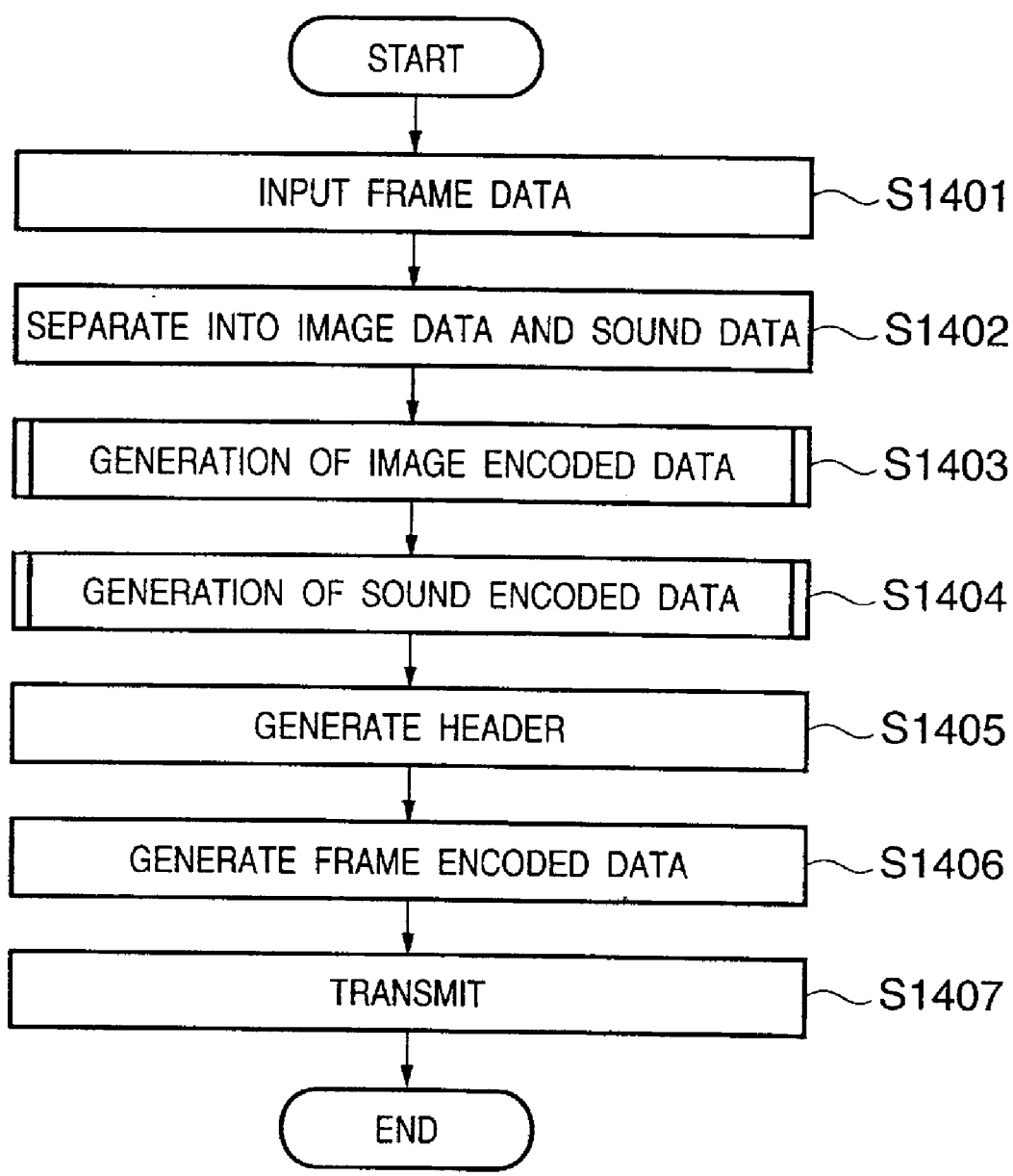
FIG. 14 is a flow chart showing a frame encoding process according to the third embodiment.

FIG. 14 is a flow chart showing a frame encoding process performed by the encoding apparatus of this embodiment having the above configuration. The process will be described below with reference to FIG. 14.

First, frame data composed of image data and sound data as shown in FIG. 2 is input to the frame data input unit 101 and output to the frame data separator 102 (step S1401). The frame data input unit 101 is, e.g., an image sensing apparatus such as a digital video camera or digital still camera, an image sensing device such as a CCD, or an interface of a network. This frame data input unit 101 can also be a RAM, ROM, hard disk, or CD-ROM.

Assume that a plurality of frames in a motion image to be encoded are input one by one to the frame data input unit 101. Assume also that processing after the frame data input unit 101 is independently performed for each frame data.

As shown in FIG. 3, the input frame data to the frame data separator 102 is separated into sound data and image data (step S1402). The image data is input to the image data encoder 103, and the sound data is input to the sound data encoder 104.

The input image data to the image data encoder 103 is encoded by processing to be described later to form image encoded data (step S1403). This image encoded data is input to the frame encoded data generator A 105.

The input sound data to the sound data encoder 104 is encoded by processing to be described later to form sound encoded data (step S1404). This sound encoded data is also input to the frame encoded data generator A 105.

Figure 4:
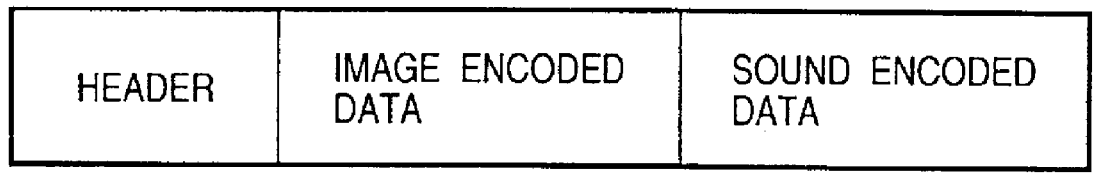
FIG. 4 is a view showing the structure of frame encoded data.

When these sound encoded data and image encoded data are input to the frame encoded data generator A 105, a header is generated (step S1405). Pieces of information written in this header are, e.g., the size of the input image to the image input unit 109 of the image data encoder 103, information such as a type which indicates whether the image is a binary image or a multilevel image, the length of image encoded data, the length of sound encoded data, a character string indicating an encoding apparatus as a transmission source, and the transmission date and time. The start address of the image encoded data and the start address of the sound encoded data are also written. As shown in FIG. 4, frame encoded data is generated by the header, sound encoded data, and image encoded data (step S1406).

The frame encoded data output unit 106 outputs (transmits) the input frame encoded data to the outside (step S1407). This frame encoded data output unit 106 can be an interface of, e.g., a public line, radio channel, or LAN.

§ Image Data Encoding Process

Figure 15:
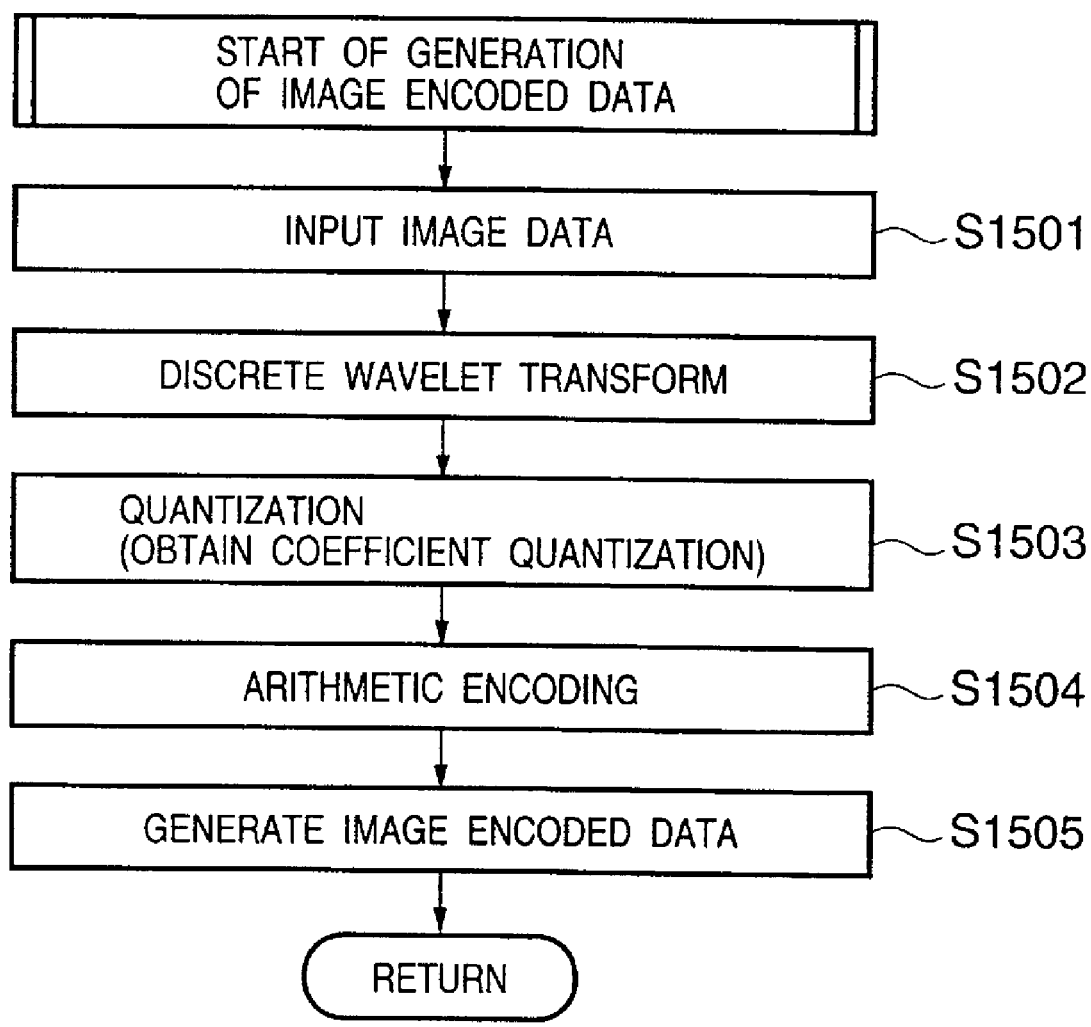
FIG. 15 is a flow chart showing an image data encoding process.

FIG. 15 is a flow chart showing the image data encoding process (step S1403) performed in the image data encoder 103. This process will be described below with reference to FIG. 15.

In this embodiment, image data as an object of encoding in a frame is 8-bit monochrome image data. However, this embodiment is also applicable to a monochrome image in which each pixel is represented by the number of bits other than 8 bits, e.g., 4, 10, or 12 bits, or to color multilevel image data expressing each color component (RGB/Lab/YCrCb) in each pixel by 8 bits. This embodiment can be further applied to a case in which information representing the state of each pixel of an image is multilevel information, e.g., a multilevel index representing the color of each pixel. When this embodiment is to be applied to these various types of multilevel information, these pieces of multilevel information need only be converted into monochrome image data to be described later.

First, the image data input unit 107 inputs pixel data constructing image data as an object of encoding in raster scan order, and this pixel data is output to the discrete wavelet transformer A 108 (step S1501).

The discrete wavelet transformer A 108 performs discrete wavelet transform by using data (reference pixel data) of a plurality of pixels (reference pixels) in image data x(n) of one input still image from the image data input unit 107 (step S1502).

The image data (discrete wavelet transform coefficient) after the discrete wavelet transform is as follows.

$$r1(n)=\text{floor}\{(x(2n)+x(2n+1))/2\}$$

$$d1(n)=x(2n+2)-x(2n+3)+\text{floor}\{-r1(n)+r1(n+2)+2)/4\}$$

In the above transform formula, r1(n) and d1(n) are discrete wavelet transform coefficient sequences (to be referred to as transform coefficient sequences hereinafter); r1(n) is a low-frequency subband, and d1(n) is a high-frequency subband. In the above formula, floor{X} represents a maximum integral value not exceeding X. FIG. 5 schematically shows this discrete wavelet transform.

The above transform formula is for one-dimensional data. However, when two-dimensional transform is performed by applying this transform in the order of horizontal direction and vertical direction, the reference pixel data can be divided into four subbands LL, HL, LH, and HH as shown in FIG. 6A. L indicates a low-frequency subband, and H indicates a high-frequency subband. The subband LL is similarly divided into four subbands (FIG. 6B), and a subband LL in this divided subband LL is further divided into four subbands (FIG. 6C). In this way, a total of 10 subbands are formed.

Referring to FIG. 6C, a number in the name of each subband indicates the level of the subband. That is, HL1, HH1, and LH1 are subbands of level 1, and HL2, HH2, and LH2 are subbands of level 2. Note that the subband LL has no suffix because there is only one subband LL, and this subband LL is a subband of level 0.

Note also that a decoded image obtained by decoding subbands from level 0 to level n will be referred to as a decoded image of level n. The higher the level of a decoded image, the higher the resolution of the image. That is, image data subjected to discrete wavelet transform as described above can display a rough shape of an original image when partially decoded.

The 10 subbands shown in FIG. 6C are once stored in the buffer 109 and output to the coefficient quantizer 110 in the order of LL, HL1, LH1, HH1, HL2, LH2, HH2, HL3, LH3, and HH3, i.e., in ascending order of subband level.

The coefficient quantizer 110 quantizes the transform coefficient of each output subband from the buffer 109 by a quantization step determined for each frequency component, and outputs the quantized value (quantized coefficient value) to the entropy encoder 111 (step S1503). Letting X be a transform coefficient value and q, the value of a quantization step for a subband (frequency component) to which the coefficient belongs, a coefficient value (quantized coefficient value) Q(X) after quantization is calculated by $$Q(X)=\text{floor}\{(X/q)+0.5\}$$

FIG. 7 shows the correspondence between frequency components and quantization steps in this embodiment. As shown in FIG. 7, larger quantization steps are given not to lower-frequency subbands (e.g., LL) but to higher-frequency subbands (e.g., HL3, LH3, and HH3). After all transform coefficients in one subband are quantized, these quantized coefficient values Q(X) are output to the entropy encoder 111.

Figure 8:
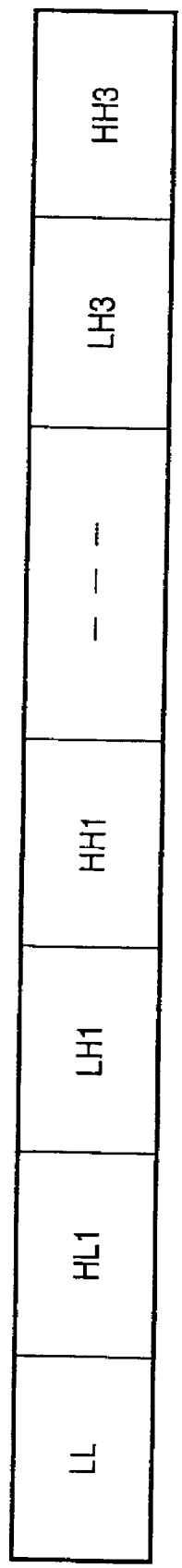
FIG. 8 is a view showing image encoded data arranged in units of subbands in ascending order of level.

The entropy encoder 111 entropy-encodes the input quantized coefficient values by arithmetic coding to generate entropy encoded values (step S1504). The generated entropy encoded values are output to the image encoded data generator A 112 and, as shown in FIG. 8, arranged in units of subbands in ascending order of subband level, thereby generating image encoded data (step S1505).

The image encoded data thus generated is output to the frame encoded data generator A 105 via the image encoded data output unit 113.

§ Sound Data Encoding Process

Figure 16:
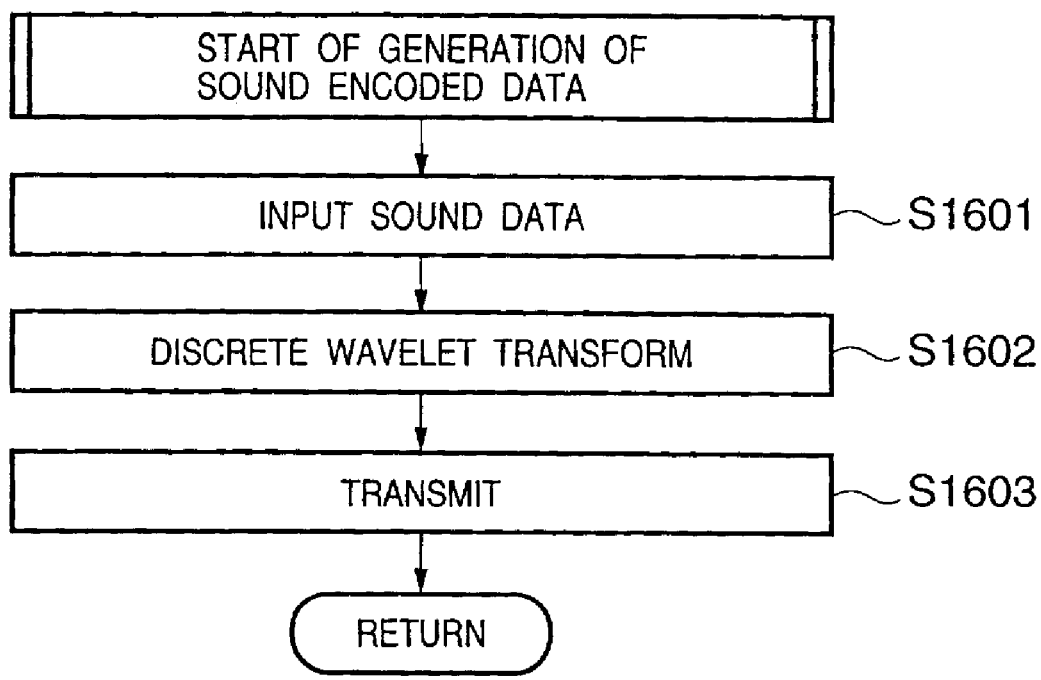
FIG. 16 is a flow chart showing a sound data encoding process.

FIG. 16 is a flow chart showing the sound data encoding process (step S1404) performed in the sound data encoder 104. This process will be described below with reference to FIG. 16.

In this embodiment, sound data as an object of encoding in a frame is input from the sound data input unit 114 and output to the discrete wavelet transformer B 115 (step S1601).

The discrete wavelet transformer B 115 performs discrete wavelet transform for input sound data y(n) from the sound data input unit 114 (step S1602).

The sound data (discrete wavelet transform coefficient) after the discrete wavelet transform is as follows.

$r2(n)=\text{floor}\{(y(2n)+y(2n+1))/2\}$ $d2(n)=y(2n+2)-y(2n+3)+\text{floor}\{-r2(n)+r2(n+2)+2)/4\}$ In the above transform formula, $r2(n)$ and $d2(n)$ are discrete wavelet transform coefficient sequences; $r2(n)$ is a low-frequency subband, and $d2(n)$ is a high-frequency subband.

Figure 9A:
FIGS. 9A to 9C are views showing sound data divided into a plurality of subbands.
Figure 9B:
Figure 9C:
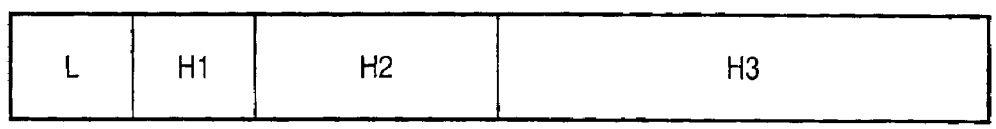

In this transform method, sound data is first divided into two subbands L and H as shown in FIG. 9A. L indicates a low-frequency subband, and H indicates a high-frequency subband. The subband L is similarly divided into two subbands (FIG. 9B), and a subband L in this divided subband L is further divided into two subbands (FIG. 9C), thereby forming a total of four subbands. As shown in FIG. 9C, these four subbands will be referred to as L, H1, H2, and H3. A number in the name of each subband indicates the level of the subband. That is, H1 is a subband of level 1, and H2 is a subband of level 2, and H3 is a subband of level 3. Note that the subband L has no suffix because there is only one subband L, and this subband L is a subband of level 0.

Note also that a decoded sound obtained by decoding subbands from level 0 to level n will be referred to as a decoded sound of level n. The higher the level of a decoded sound, the closer the sound to its original sound. That is, sound data subjected to discrete wavelet transform as described above can roughly reproduce its original sound when partially decoded.

The four subbands shown in FIG. 9C are output as sound encoded data to the frame encoded data generator A 105 via the sound encoded data output unit 116 (step S1603).

In the encoding apparatus and encoding method according to this embodiment as described above, both image data and sound data contained in frame data can be given a scalability function by discrete wavelet transform of these data. Therefore, even when one frame encoded data is not completely decoded but only partially decoded in a display period, it is possible to display a rough shape of the original image and roughly reproduce the original sound.

Note that program codes of the flow charts shown in FIGS. 14, 15, and 16 are stored in a memory (ROM or RAM, not shown) or in an external storage (not shown) and read out and executed by a CPU (not shown).

<Second Embodiment>

The second embodiment according to the present invention will be described below.

In a server/client model, a server generally transmits data requested by a client. In this transmission, a data amount each client asks the server changes in accordance with the data transfer capacity of a line connecting the server and the client. Therefore, in accordance with a data amount each client requests, a part or the whole of data stored in the server is extracted and transmitted to the client. When a part of data is to be transmitted to a client, even this partial data must be meaningful to the client. An operation in which a server extracts a part of data and transmits this partial data to a client will be referred to as partial transmission of data hereinafter.

In partial transmission of frame encoded data generated by discrete wavelet transform of image data and sound data, both image encoded data and sound encoded data are desirably transmitted in units of subbands. Furthermore, to match the image quality of a decoded image with the sound quality of a decoded sound, the levels of subbands of image encoded data and sound encoded data to be partially transmitted are preferably matched.

The characteristic feature of this second embodiment, therefore, is to generate frame encoded data by grouping the levels of image encoded data and sound encoded data when reconstructing a decoded image and decoded sound by receiving partial transmission of the frame encoded data, so that the image quality and sound quality in a reconstructed frame match.

FIG. 10 is a block diagram showing the arrangement of an encoding apparatus according to the second embodiment. This encoding apparatus of the second embodiment includes a frame encoded data generator B 1001 in place of the frame encoded data generator A 105 of the encoding apparatus of the first embodiment. The rest of the arrangement is the same as the first embodiment, so the same reference numerals as in the first embodiment denote the same parts and a detailed description thereof will be omitted.

When sound encoded data and image encoded data are input to this frame encoded data generator B 1001, a header is generated as in the first embodiment. Frame encoded data is generated from the header, sound encoded data, and image encoded data. That is, as shown in FIG. 11, this frame encoded data is generated by grouping subbands of the same level in the image encoded data and sound encoded data.

Figure 11:
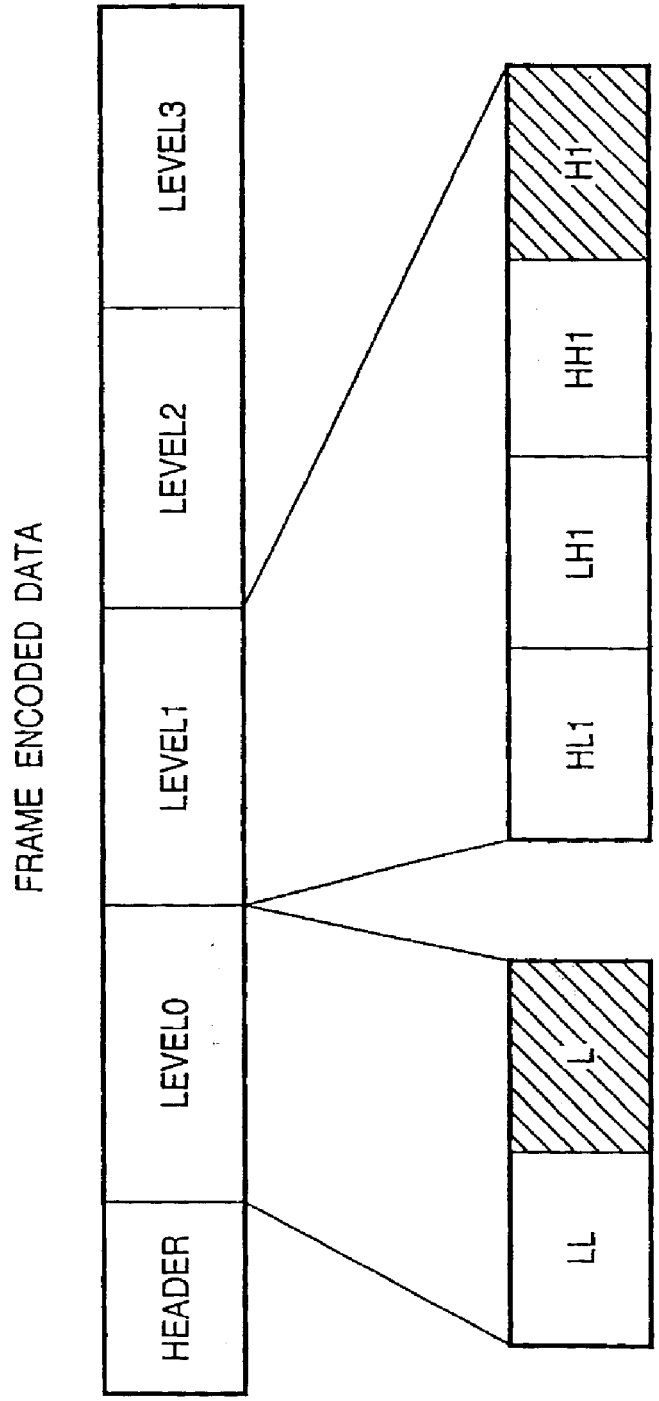
FIG. 11 is a view showing the structure of frame encoded data according to the second embodiment.

In the frame encoded data shown in FIG. 11, data of level 0 is the group of a subband (LL) of level 0 of the image encoded data and a subband (L) of level 0 of the sound encoded data. Data of level 1 is the group of subbands (HL1, LH1, and HH1) of level 1 of the image encoded data and a subband (H1) of level 1 of the sound encoded data. Likewise, data of levels 2 and 3 are the groups of subbands of levels 2 and 3, respectively, of the image encoded data and the sound encoded data.

In an encoding process of this second embodiment, the process of grouping subbands of the same level of image encoded data and sound encoded data, as shown in FIG. 11, is added to the frame encoded data generation process in step S1406 of the flow chart in FIG. 14. Also, flow charts of processes performed in an image data encoder 103 and a sound data encoder 104 are the same flow charts as in the first embodiment, i.e., the flow charts in FIGS. 15 and 16, respectively.

Furthermore, program codes of these flow charts are stored in a memory (ROM or RAM, not shown) or in an external storage (not shown) and read out and executed by a CPU (not shown).

In the encoding apparatus and encoding method according to the second embodiment as described above, frame encoded data is generated by grouping the levels of subbands of image encoded data and sound encoded data. Therefore, even when a decoded image and decoded sound are to be reconstructed on the basis of partial transmission of frame encoded data, the image quality and sound quality in a reconstructed frame can be properly matched.

Also, it is obvious from the above explanation that the encoding apparatus and encoding method of the second embodiment also achieve the same effects as the encoding apparatus and encoding method of the first embodiment.

<Third Embodiment>

The third embodiment according to the present invention will be described below.

As explained in the above second embodiment, a data amount each client asks a server changes in accordance with the data transfer capacity of a line connecting the server and the client.

When a plurality of different lines having different data transfer capacities are available, generating frame encoded data in accordance with the transfer capacity of each line is preferable to increase the rate of partial transmission.

The characteristic feature of this third embodiment, therefore, is to generate frame encoded data in accordance with the transfer capacity of a line to be used when performing partial transmission of the frame encoded data.

Figure 12:
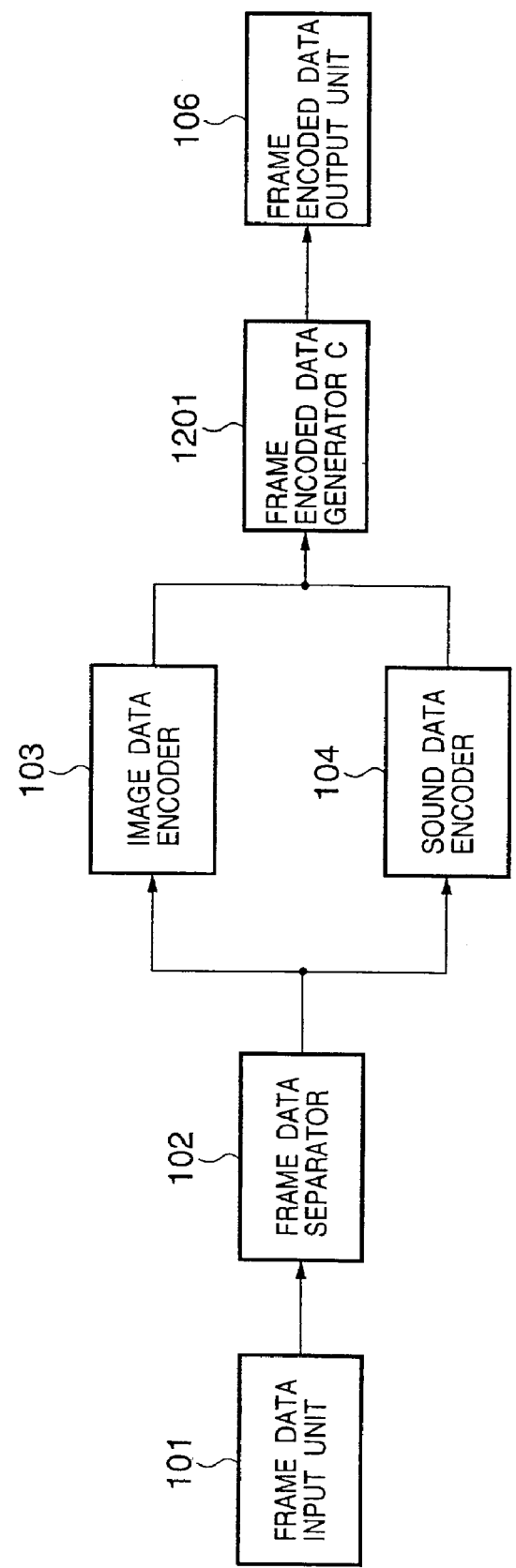
FIG. 12 is a block diagram showing the arrangement of an encoding apparatus according to the third embodiment.

FIG. 12 shows the arrangement of an encoding apparatus according to the third embodiment. This encoding apparatus according to the third embodiment includes a frame encoded data generator C 1201 in place of the frame encoded data generator A 105 of the encoding apparatus of the first embodiment.

Two types of lines A and B are connected to a server for storing frame encoded data generated by the encoding apparatus according to the third embodiment. The line A can transmit only part of frame encoded data, and the line B can well transmit the whole of frame encoded data.

When sound encoded data and image encoded data are input to the frame encoded data generator C 1201, a header is generated as in the first embodiment. Frame encoded data is generated from the header, sound encoded data, and image encoded data.

Figure 13:
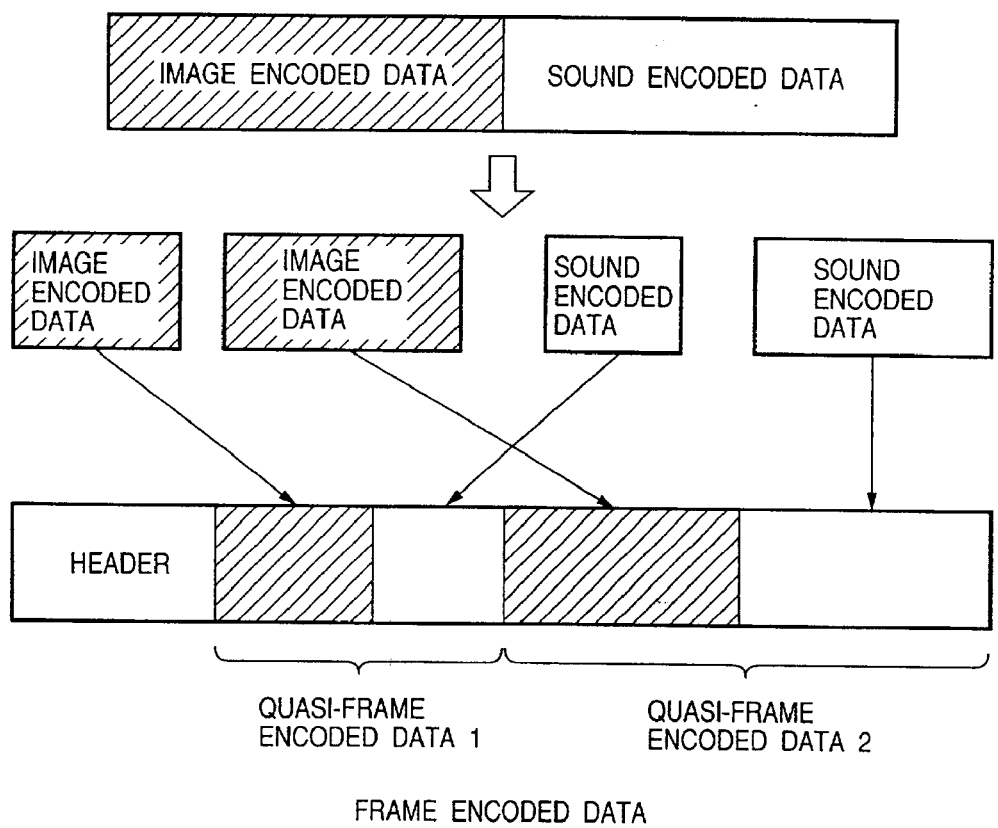
FIG. 13 is a view showing the structure of frame encoded data according to the third embodiment.

As shown in FIG. 13, frame encoded data (quasi-frame encoded data) except for the header is composed of quasi-frame encoded data 1 and quasi-frame encoded data 2. Each of these quasi-frame encoded data contains image encoded data and sound encoded data. Quasi-frame encoded data 1 is extracted from low-frequency components of the image encoded data and sound encoded data in accordance with the code amount transferable by the line A. Quasi-frame encoded data 2 is obtained by excluding quasi-frame encoded data 1 from the image encoded data and sound encoded data. Assume that the code amounts transferable by the lines A and B are previously known and these values are prestored in a predetermined memory (ROM or RAM).

Since frame encoded data is generated as described above, the server can transmit this frame encoded data at the maximum transfer rate of each line.

In an encoding process according to the third embodiment, a process of extracting image encoded data and sound encoded data corresponding to the code amount of a line to be used is added to the frame encoded data generation process in step S1406 of the flow chart shown in FIG. 14 explained in the first embodiment.

Also, processes performed in an image data encoder 103 and a sound data encoder 104 follow the same flow charts as in the first embodiment, i.e., the flow charts in FIGS. 15 and 16, respectively.

Furthermore, program codes of these flow charts are stored in a memory (RAM or ROM, not shown) or in an external storage (not shown) and read out and executed by a CPU (not shown).

In the encoding apparatus and encoding method according to the third embodiment as described above, frame encoded data to be partially transmitted can be generated in accordance with the transfer rate of a line to be used.

In the third embodiment, two types of lines different in transfer capacity are connected to a server. However, three or more types of lines differing in transfer rate can of course be connected to a server.

<Fourth Embodiment>

The fourth embodiment according to the present invention will be described below.

In each of the above embodiments, low-frequency components are first transmitted by assuming that these low-frequency components are significant in sound data. However, human voice data (speech data) is often handled as data of significance in sound data.

The characteristic feature of this fourth embodiment, therefore, is to separate sound data into speech data as most significant data and non-speech data (of little significance) other than the speech data, and separately encode these speech data and non-speech data to generate speech encoded data and non-speech encoded data, respectively. In addition, significant data (low-frequency subband) in image encoded data and the speech encoded data are gathered as a group of most significant level, and other image and sound data are also grouped in accordance with their levels. In this manner, frame encoded data is generated.

An encoding method according to the fourth embodiment will be described below.

Figure 17:
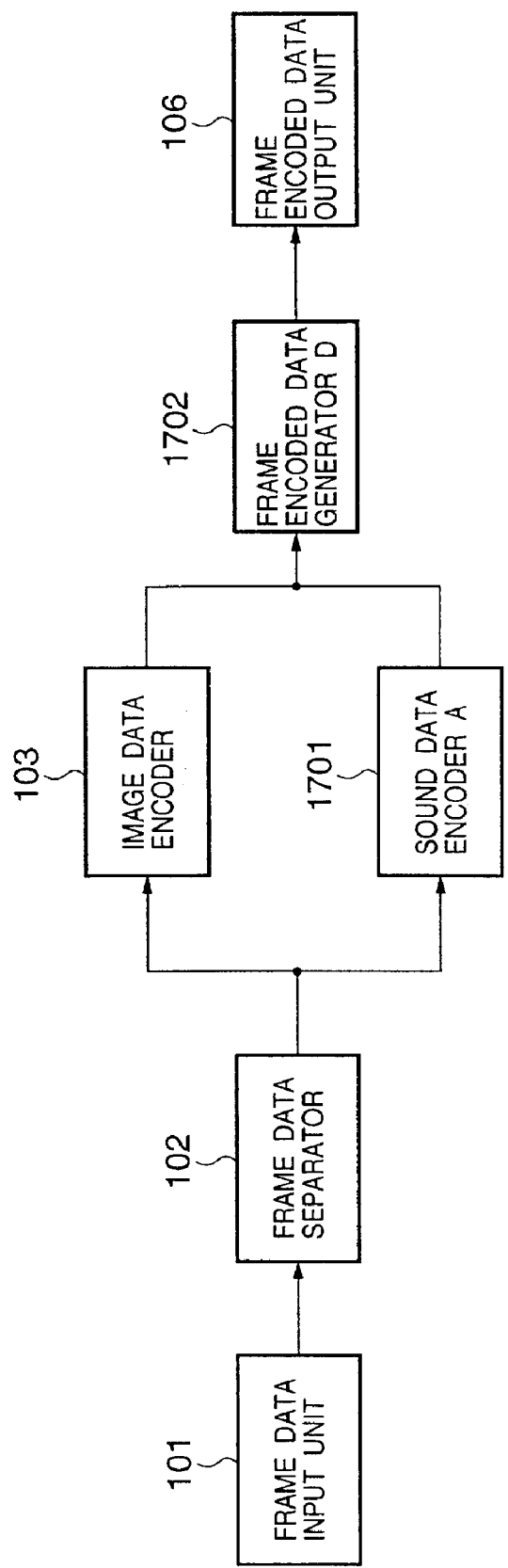
FIG. 17 is a block diagram showing the arrangement of an encoding apparatus according to the fourth embodiment.

FIG. 17 is a block diagram showing the arrangement of an encoding apparatus according to the fourth embodiment. This encoding apparatus includes a sound data encoder A 1701 and a frame encoded data generator D 1702 in place of the sound data encoder 104 and the frame encoded data generator A 105, respectively, shown in FIG. 14 of the first embodiment.

Figure 18:
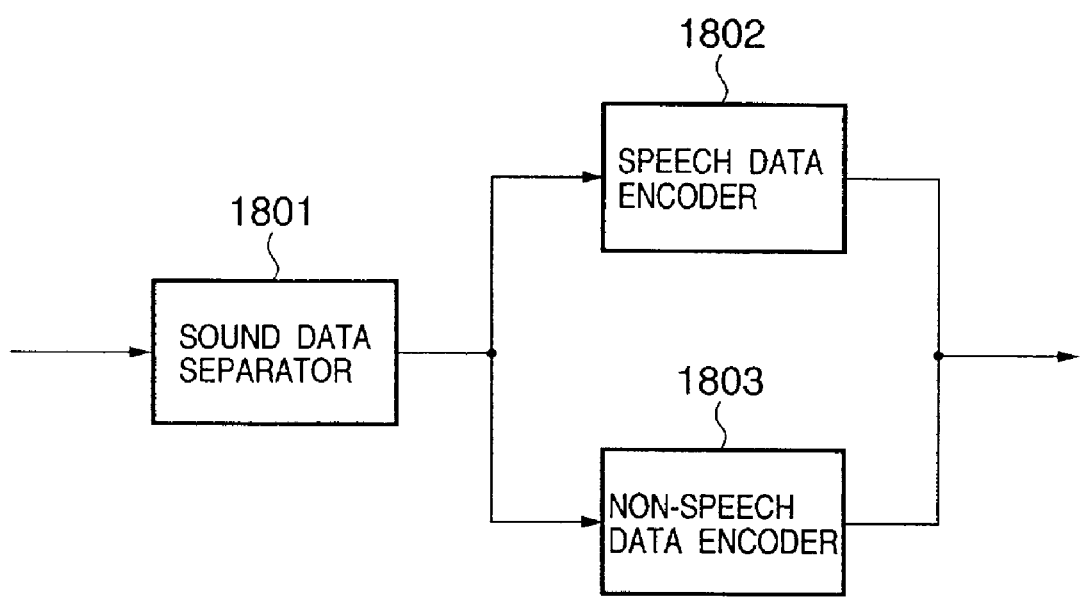
FIG. 18 is a block diagram showing the arrangement of a sound data encoder A 1701.

FIG. 18 is a block diagram showing the arrangement of the sound data encoder A 1701. In FIG. 18, reference numeral 1801 denotes a sound data separator; 1802, a speech data encoder; and 1803, a non-speech data encoder.

A frame encoding process in the encoding apparatus of the fourth embodiment having the above configuration will be described below. Processes in a frame data input unit 101, a frame data separator 102, and an image data encoder 103 are the same as in the first embodiment described earlier, so a detailed description thereof will be omitted. The operation of the sound data encoder A 1701 will be mainly explained.

Input sound data to the sound data encoder A 1701 is separated into speech data and non-speech data. As this sound data separation method, known technologies such as separation and extraction of frequency components corresponding to speech can be used, so a detailed description thereof will be omitted. The separated speech data and non-speech data are input to the speech data encoder 1802 and the non-speech data encoder 1803, respectively.

The speech data encoder 1802 encodes the input speech data by HVXC (Harmonic Vector excitation Coding). The non-speech data encoder 1803 encodes the non-speech data by MP3 (MPEG Audio Layer III). The speech encoded data and non-speech encoded data thus generated are output to the frame encoded data generator D 1702.

Figure 19:
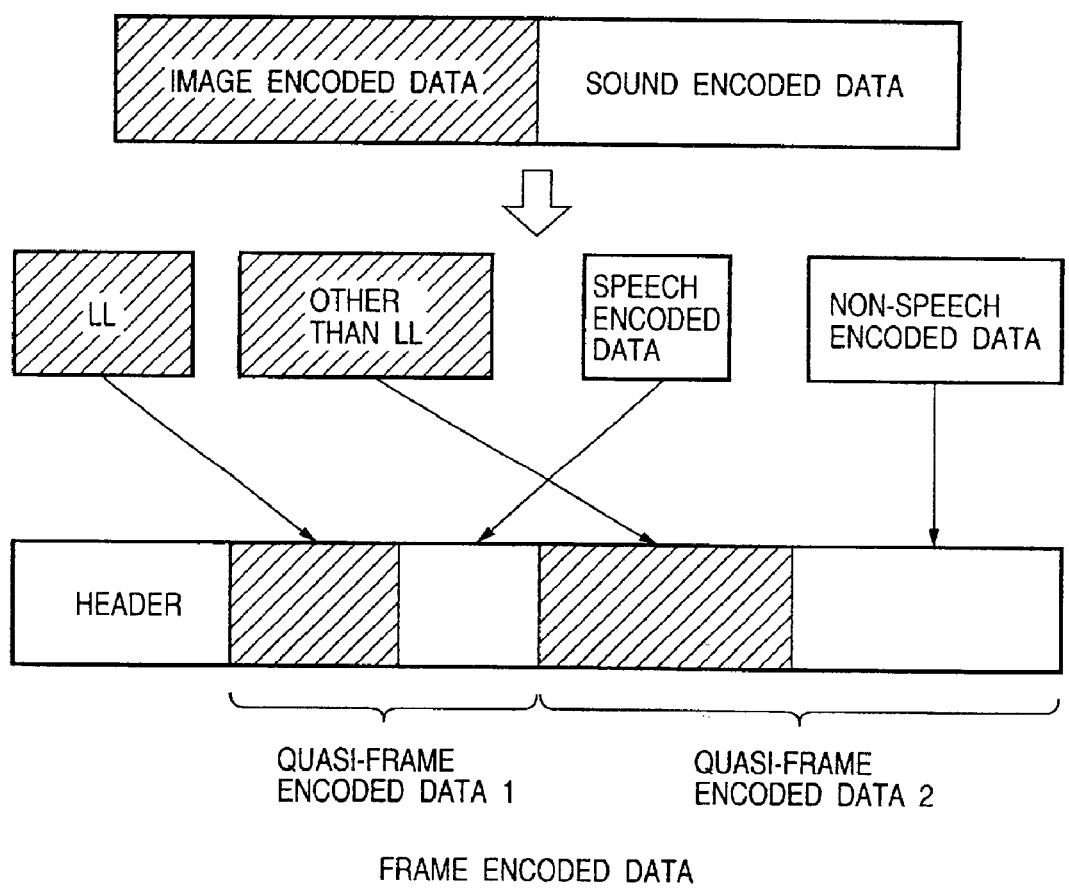
FIG. 19 is a view showing the structure of frame encoded data according to the fourth embodiment.

In this frame encoded data generator D 1702, as shown in FIG. 19, a subband LL of image encoded data and the speech encoded data are grouped into quasi-frame encoded data 1. Also, image encoded data other than the subband LL and the non-speech encoded data are grouped into quasi-frame encoded data 2. A header and these quasi-frame encoded data 1 and 2 are integrated to generate frame encoded data.

In the fourth embodiment as described above, it is possible to generate frame encoded data which enables transmission/decoding by which priority is given to speech data regarded as significant in sound data.

<Fifth Embodiment>

The fifth embodiment according to the present invention will be described below.

In the fourth embodiment described above, sound data is separated into speech data and non-speech data, i.e., into two types (two levels), so sound encoded data is also separated into two groups, i.e., quasi-frame encoded data 1 and 2.

It is also possible to separate sound data into multiple levels including speech data and non-speech data 1, non-speech data 2, . . . , non-speech data n by further dividing non-speech data into two or more levels on the basis of various references. Consequently, an image and sound can be composed of multilevel groups.

In the fifth embodiment, sound data is separated into two or more levels and encoded as multilevel groups including image data.

Figure 20:
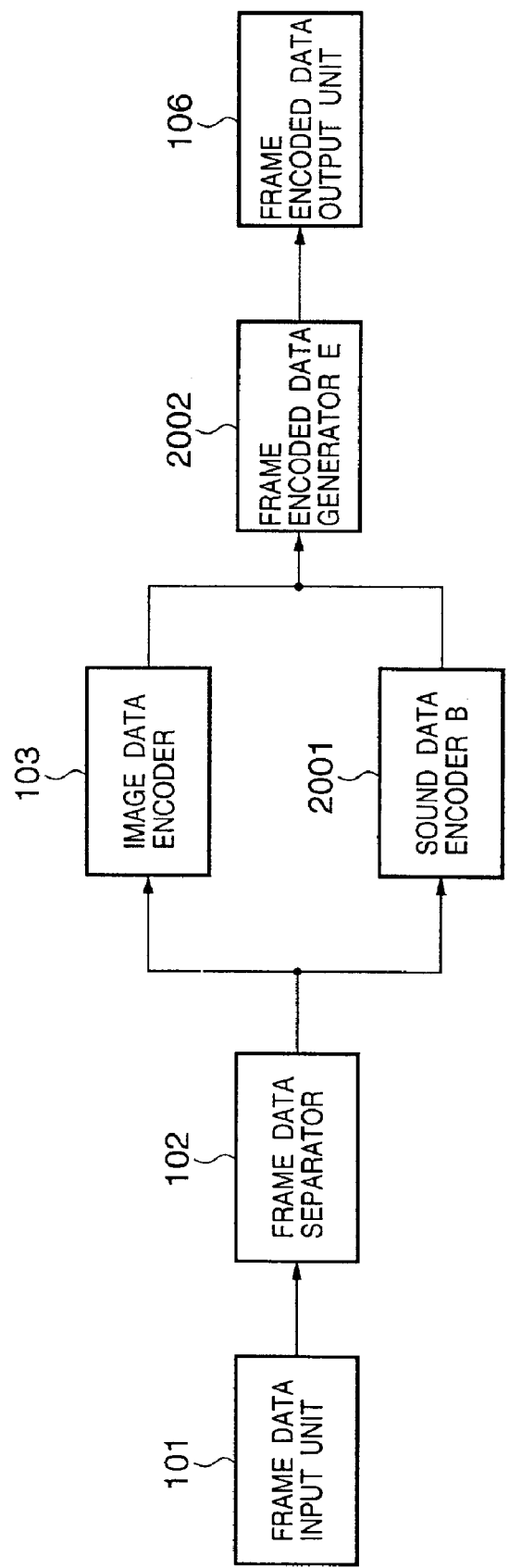
FIG. 20 is a block diagram showing the arrangement of an encoding apparatus according to the fifth embodiment.

FIG. 20 is a block diagram showing the arrangement of an encoding apparatus according to the fifth embodiment. This encoding apparatus includes a sound data encoder B 2001 and a frame encoded data generator E 2002 in place of the sound data encoder 104 and the frame encoded data generator A 105, respectively, shown in FIG. 14 of the first embodiment described earlier.

Figure 21:
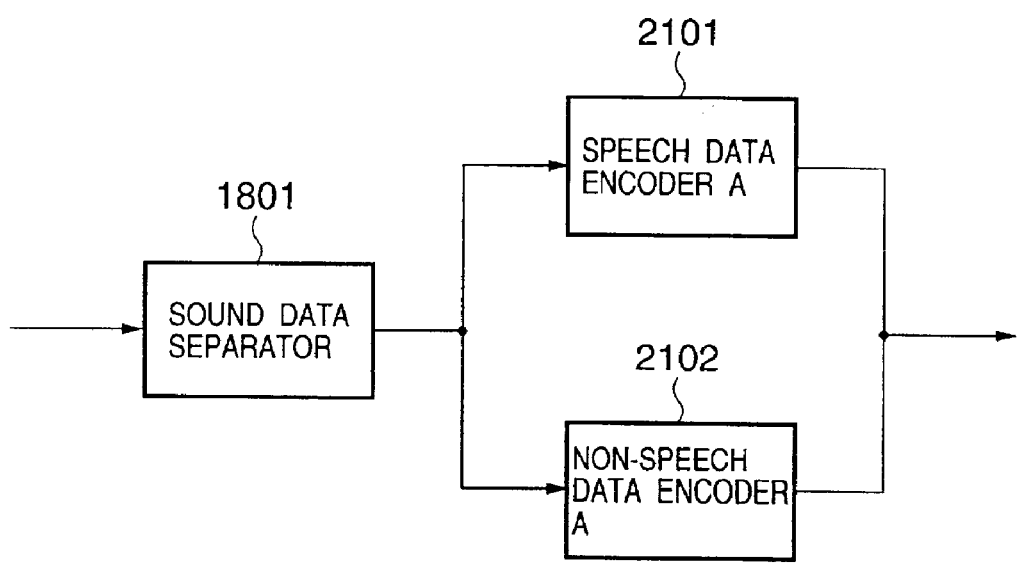
FIG. 21 is a block diagram showing the arrangement of a sound data encoder B 2001.

FIG. 21 is a block diagram showing the arrangement of the sound data encoder B 2001. Reference numeral 1801 denotes a sound data separator; 2101, a speech data encoder A; and 2102, a non-speech data encoder A.

The speech data encoder A 2101 encodes speech data by, e.g., CELP (Code Excited Linear Prediction). Also, non-speech data is separated into a monaural sound source as a first level and a stereo sound source as a second level. The first level is encoded by Twin VQ (Transform domain Weighted Interleave Vector Quantization), and the second level is encoded by AAC (Advanced Audio Coding). The encoded first- and second-level non-speech data are called first and second non-speech encoded data, respectively. These speech encoded data and first and second non-speech encoded data are output to the frame encoded data generator E 2002.

Figure 22:
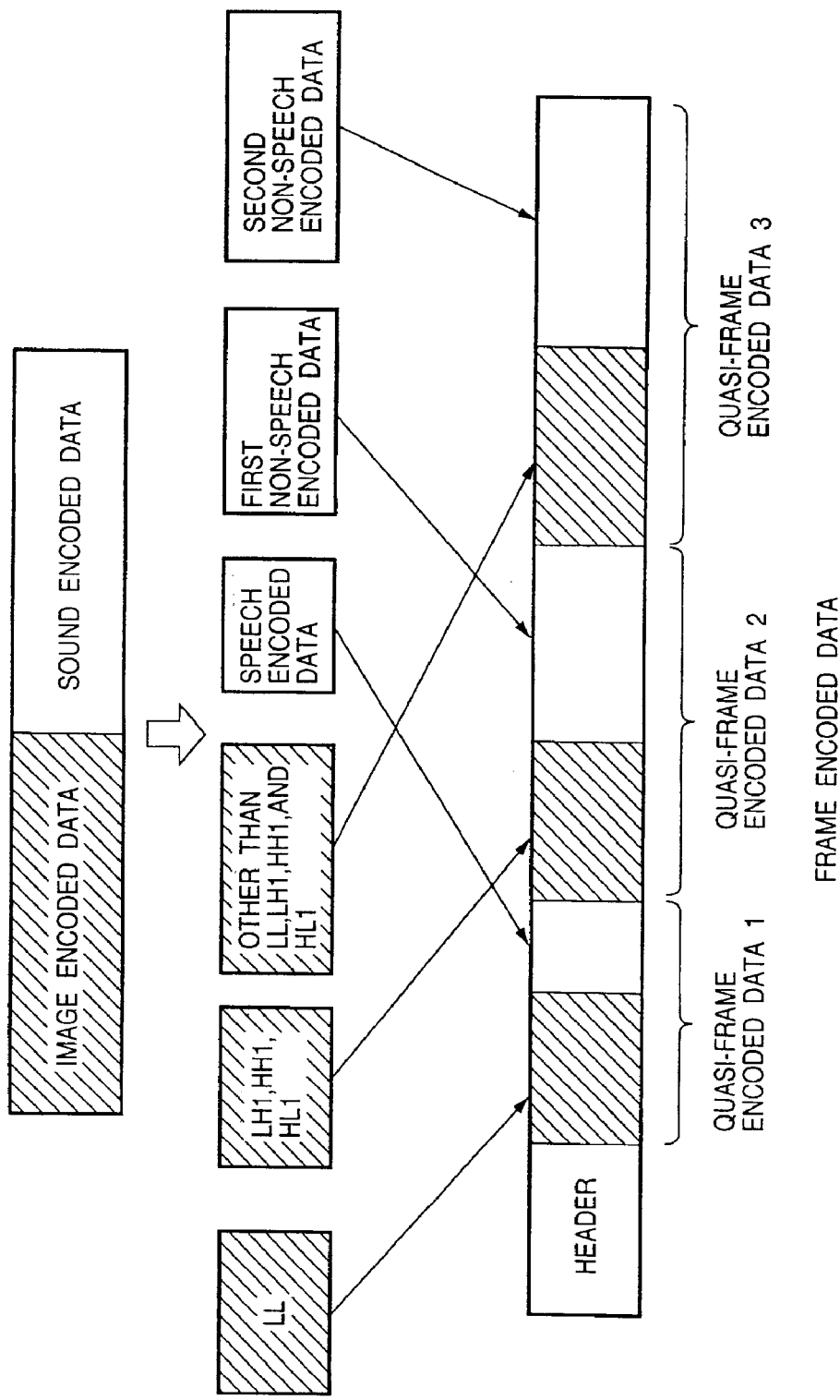
FIG. 22 is a view showing the structure of frame encoded data according to the fifth embodiment.

In this frame encoded data generator E 2002, as shown in FIG. 22, a subband LL of image encoded data and the speech encoded data are grouped into quasi-frame encoded data 1, subbands HL1, HH1, and LH1 and the first non-speech encoded data are grouped into quasi-frame encoded data 2, and subbands other than the subbands LL, HL1, HH1, and LH1 and the second non-speech encoded data are grouped into quasi-frame encoded data 3. After that, a header and quasi-frame encoded data 1, 2, and 3 are integrated to generate frame encoded data.

In the fifth embodiment as described above, hierarchical transmission/decoding can be performed in multiple stages by separating sound data into multilevel data and generating two or more image and sound groups.

In the fifth embodiment, non-speech data is simply separated into two levels (a monaural sound source and stereo sound source). However, the present invention is not limited to this embodiment. For example, it is also possible to divide non-speech data into three or more frequency bands by discrete wavelet transform and use these frequency bands as multilevel non-speech data.

<Sixth Embodiment>

The sixth embodiment according to the present invention will be described below.

In the second to fifth embodiments described above, image encoded data and sound encoded data are grouped. However, a data type to be given priority may change in accordance with the type of motion image (and the type of sound attached to it) to be encoded. For example, in the case of a music promotion video, transmission and decoding of high-quality sound data are regarded as important. In the case of a sports broadcasting video, transmission and decoding of high-quality images are regarded as important.

This sixth embodiment, therefore, is characterized in that encoded data grouping methods can be selected in accordance with various situations.

Figure 23:
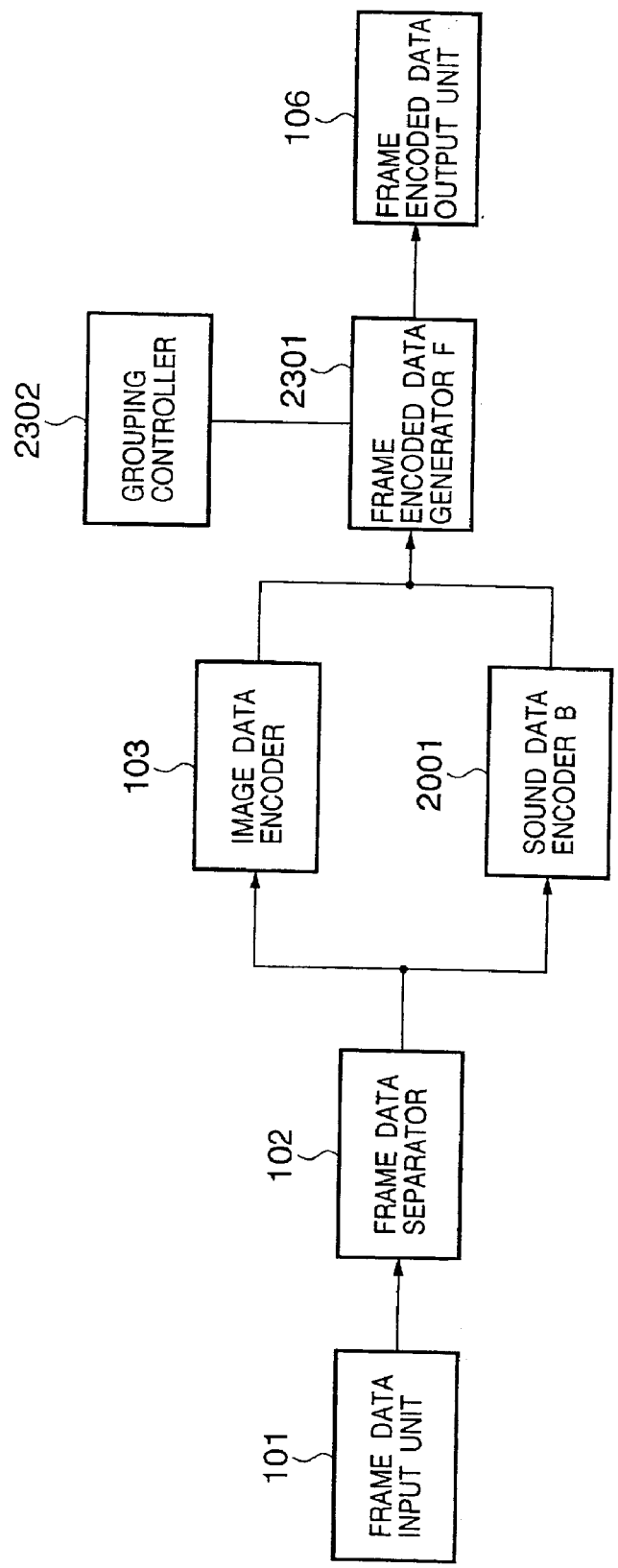
FIG. 23 is a block diagram showing the arrangement of an encoding apparatus according to the sixth embodiment.

FIG. 23 is a block diagram showing the arrangement of an encoding apparatus according to the sixth embodiment. This encoding apparatus includes a frame encoded data generator F 2301 in place of the frame encoded data generator E 2002 shown in FIG. 20 of the fifth embodiment, and further includes a grouping controller 2302.

Note that image encoded data and sound encoded data generated in the sixth embodiment have multiple levels as in the above-mentioned fifth embodiment.

When image encoded data and sound encoded data are input to the frame encoded data generator F 2301, the grouping controller 2302 operates and gives the frame encoded data generator F 2301 an instruction (grouping method instruction) concerning a method of grouping.

This grouping method instruction given by the grouping controller 2302 can be manually input by an operator. The instruction may also be automatically input by a program installed in the grouping controller 2302. In the sixth embodiment, assume that selectable grouping methods are three types: "normal", "image quality priority", and "sound quality priority".

Figure 24:
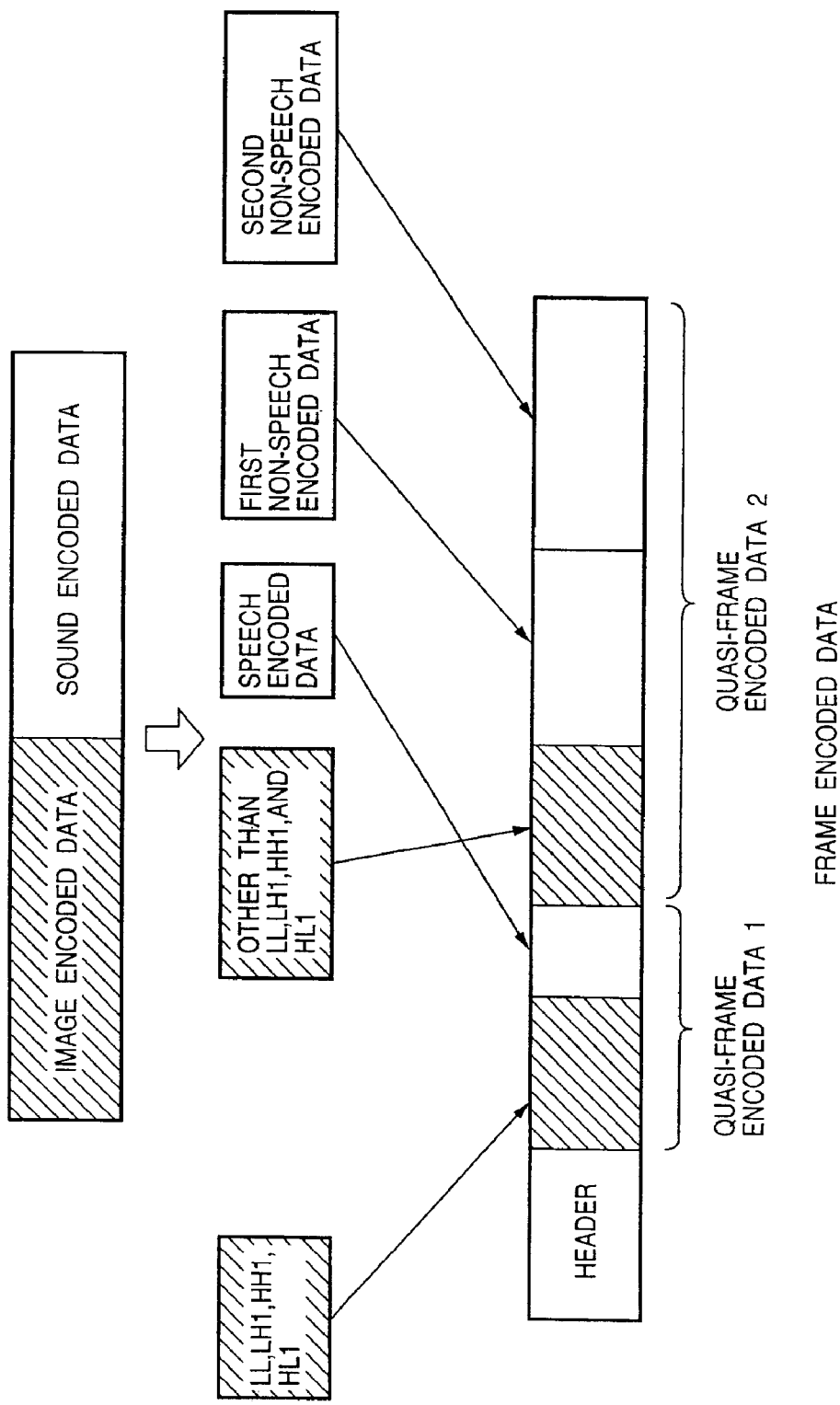
FIG. 24 is a view showing the structure of frame encoded data when image quality is given priority in the sixth embodiment.
Figure 25:
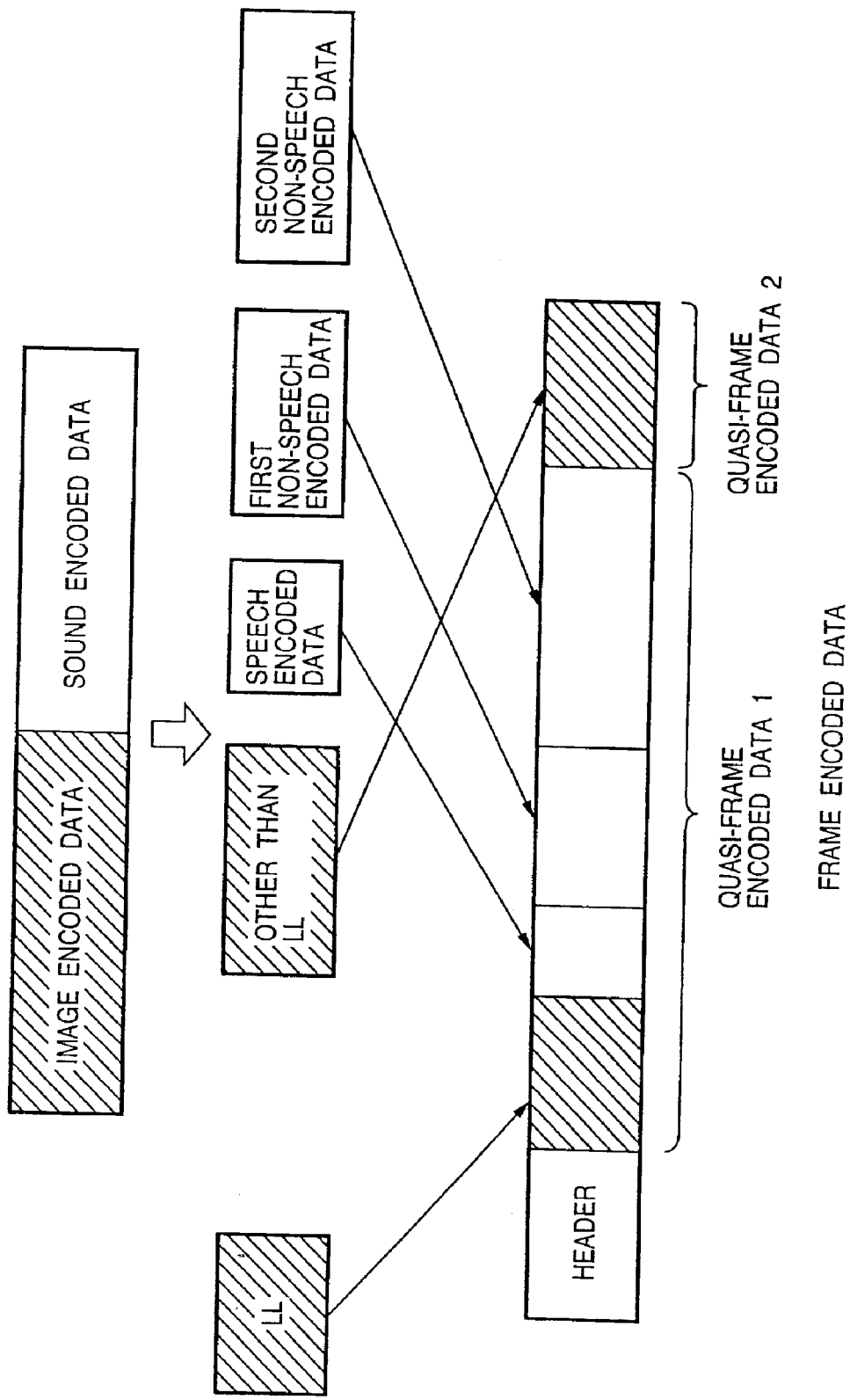
FIG. 25 is a view showing the structure of frame encoded data when sound quality is given priority in the sixth embodiment.

When receiving the grouping method instruction from the grouping controller 2302, the frame encoded data generator F 2301 generates encoded data on the basis of the instruction. For example, if the grouping method instruction is "normal", multilevel grouping is performed as in the fifth embodiment. If the grouping method instruction is "image quality priority", grouping is performed as shown in FIG. 24 such that image data of levels 0 and 1 are preferentially gathered into a first group (quasi-frame encoded data 1). If the grouping method instruction is "sound quality priority", grouping is performed as shown in FIG. 25 such that image data of level 0 and sound data of all levels are gathered into a first group (quasi-frame encoded data 1).

In the sixth embodiment as described above, various grouping methods can be selectively performed.

In the sixth embodiment, the number of grouping types is three for the sake of descriptive simplicity. However, types of grouping methods are of course not restricted to the above three types. For example, "image quality priority" and/or "sound quality priority" can further include a plurality of types of grouping methods.

Also, grouping methods need not be selected on the basis of concepts such as "image quality priority" and "sound quality priority" as described above. That is, the present invention incorporates an arrangement in which the grouping methods explained in the individual embodiments described above can be selectively used in a single apparatus.

<Seventh Embodiment>

The seventh embodiment according to the present invention will be described below.

When frame encoded data generated in each of the above embodiments is to be transmitted, frame encoded data to be allocated to low-bit-rate transmission must be varied in accordance with variations in the status of a line or with the CPU power of a decoding side.

This seventh embodiment, therefore, is characterized in that grouping methods can be adaptively switched in accordance with the status of a decoding side.

Figure 26:
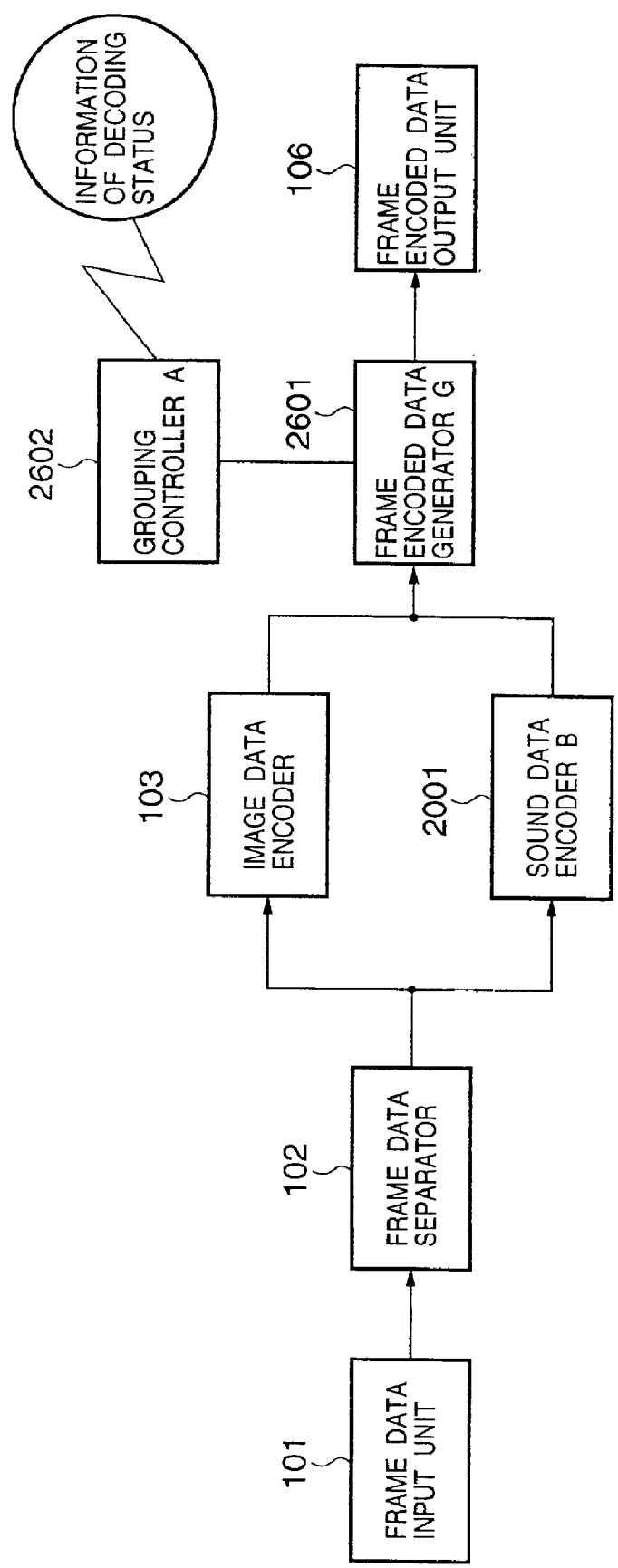
FIG. 26 is a block diagram showing the arrangement of an encoding apparatus according to the seventh embodiment.

FIG. 26 is a block diagram showing the arrangement of an encoding apparatus according to the seventh embodiment. This encoding apparatus includes a frame encoded data generator G 2601 and a grouping controller A 2602 in place of the frame encoded data generator F 2301 and the grouping controller 2302, respectively, shown in FIG. 23 of the sixth embodiment.

Note that image encoded data and sound encoded data generated in the seventh embodiment have multiple levels as in the above-mentioned fifth embodiment.

The grouping controller A 2602 can receive information indicating the decoding status (the degree to which each frame encoded data is decoded within a predetermined time), in a decoding apparatus, of frame encoded data transmitted from this encoding apparatus. When receiving this decoding status information, the grouping controller A 2602 determines a grouping method suited to a frame currently being encoded or to a frame whose encoding is to be started.

For example, if the grouping controller A 2602 detects the status that each frame encoded data transmitted is not reliably decoded and reconstructed by a decoder of the receiving side, the grouping controller A 2602 switches to a grouping method which reduces the data amount of image and/or sound contained in a group corresponding to the lowest level. On the other hand, if the grouping controller A 2602 detects the status that each frame encoded data transmitted is decoded and reconstructed by a decoder on the receiving side and the decoding time still has a margin, the grouping controller A 2602 switches to a grouping method which increases the data amount of image and/or sound contained in a group corresponding to the lowest level.

The frame encoded data generator G 2601 generates frame encoded data by performing appropriate grouping in accordance with the instruction from the grouping controller A 2602 as described above.

In the seventh embodiment as described above, optimum grouping taking account of the decoding status of transmitted encoded data can be performed.

<Other Embodiment>

In the first to third embodiments described earlier, discrete wavelet transform for image data and that for sound data are performed by the same arithmetic operation method. However, different arithmetic operation methods may also be used.

Also, sound data subjected to discrete wavelet transform may be quantized similar to image encoded data. Furthermore, entropy encoding such as arithmetic encoding may be performed for this quantized sound data.

To facilitate access to an arbitrary address in frame encoded data, it may be possible to add to image encoded data or sound encoded data a bit indicating the start and end of the data and indicating the start and end of a subband in the data.

Speech data encoding methods are not limited to those explained in the fourth to seventh embodiments. For example, G.729 and G.723.1 may also be used. It is also possible to use, e.g., HILIN (Harmonic and Individual Lines plus Noise) or BSAC (Bit Slice Arithmetic Coding) as a non-speech data encoding method.

(Modifications)

The present invention may be applied to a system constituted by a plurality of devices (e.g., a host computer, interface, reader, and printer) or to an apparatus (e.g., a digital video camera or digital still camera) comprising a single device.

Further, the present invention is not restricted to apparatuses and methods of implementing the above embodiments. That is, the present invention includes case in which the above embodiments are implemented by supplying program codes of software for implementing the embodiments to an internal computer (CPU or MPU) of a system or apparatus, and allowing the computer of the system or apparatus to operate the above-mentioned various devices in accordance with the program codes.

In this case, the program codes of the software implement the functions of the above embodiments, so the program codes and a means for supplying the program codes to the computer, i.e., a storage medium storing the program codes are included in the present invention.

As this storage medium for storing the program codes, it is possible to use, e.g., a floppy disk, hard disk, optical disk, magnetooptical disk, CD-ROM, magnetic tape, nonvolatile memory card, and ROM.

Furthermore, besides the functions of the above embodiments are implemented by controlling the various devices in accordance with the supplied program codes by the computer, the present invention includes a case where the program codes implement the embodiments in cooperation with an OS (Operating System) or another software running on the computer.

Furthermore, the present invention also includes a case where, after the supplied program codes are stored in a memory of a function extension board inserted into the computer or of a function extension unit connected to the computer, a CPU or the like of the function extension board or function extension unit performs a part or the whole of actual processing in accordance with designations by the program codes and thereby implements the functions of the above embodiments.

In the present invention, as has been described above, it is possible to appropriately give scalability to both image data and sound data already encoded, without decoding them, and thereby generating encoded data containing both the data.

It is also possible to generate and transmit encoded data by grouping image data and sound data in each frame of a motion image in appropriate units, thereby allowing efficient utilization of the encoded data on the receiving side.

As many apparently widely different embodiments of the present invention can be made without departing from the spirit and scope thereof, it is to be understood that the invention is not limited to the specific embodiments thereof except as defined in the claims.

What is claimed is:

1. An encoding apparatus for encoding frame data containing image data and sound data, comprising:

separating means for separating the image data and sound data contained in the frame data;

image data encoding means for encoding the separated image data in sequence from a lower to a higher frequency component thereof, thereby generating image encoded data;

sound data encoding means for encoding the separated sound data in sequence from a lower to a higher frequency component thereof, thereby generating sound encoded data; and frame encoded data generating means for generating header information by using the image encoded data and the sound encoded data, and generating frame encoded data by using the header information, the image encoded data, and the sound encoded data.

2. The apparatus according to claim 1, wherein the header information contains at least one of the size of the image data, image type information of the image data, the length of the image encoded data, the length of the sound encoded data, identification information of said encoding apparatus, the transmission date and time, the start address of the image encoded data, and the start address of the sound encoded data.

3. The apparatus according to claim 1, wherein said image data encoding means generates a transform coefficient sequence for subbands by performing discrete wavelet transform for the image data, groups subbands of the same level, and sequentially encodes the transform coefficient sequence from a lower- to a higher-level subband, thereby generating the image encoded data.

4. The apparatus according to claim 1, wherein said sound data encoding means generates a transform coefficient sequence for subbands by performing a discrete wavelet transform for the sound data, groups subbands of the same level, and sequentially encodes the transform coefficient sequence from a lower- to a higher-level subband, thereby generating the sound encoded data.

5. The apparatus according to claim 1, wherein said frame encoded data generating means generates the frame encoded data by arranging the header information, the image encoded data, and the sound encoded data in the order named.

6. The apparatus according to claim 1, wherein said frame encoded data generating means generates the frame encoding data by grouping subbands of the same level in the image encoded data and the sound encoded data, and arranging the groups in ascending order of level following the header information.

7. The apparatus according to claim 1, wherein said frame encoded data generating means generates the frame encoded data by using quasi-frame encoded data composed of a portion of the image encoded data and a portion of the sound encoded data.

8. An encoding apparatus for encoding frame data containing image data and sound data, comprising:

separating means for separating the image data and the sound data contained in the frame data;

image data encoding means for hierarchizing the image data into a plurality of types of image data and encoding the plurality of types of image data, thereby generating image encoded data corresponding to a plurality of levels;

sound data encoding means for hierarchizing the sound data into a plurality of types of sound data and encoding the plurality of types of sound data, thereby generating sound encoded data corresponding to a plurality, of levels; and frame encoded data generating means for generating frame encoded data by using the image encoded data and the sound encoded data, wherein said frame encoded data generating means generates the frame encoded data by forming a plurality of groups of different levels by grouping the image encoded data and sound encoded data belonging to the same level determined on the basis of a predetermined reference, and arranging the plurality of groups in descending order of significance level.

9. The apparatus according to claim 8, wherein the plurality of types of image data hierarchized by said image data encoding means correspond to a plurality of frequency components obtained by a discrete wavelet transform of the image data.

10. The apparatus according to claim 8, wherein the plurality of types of sound data hierarchized by said sound data encoding means correspond to speech data which corresponds to a human voice and non-speech data other than the speech data.

11. The apparatus according to claim 10, wherein said frame encoded data generating means groups encoded data of the speech data as sound encoded data of a significant level together with first image encoded data, and groups encoded data of the non-speech data as sound encoded data of an insignificant level together with second image encoded data.

12. The apparatus according to claim 11, wherein the plurality of types of image data hierarchized by said image data encoding means contain a first frequency component obtained by a discrete wavelet transform of the image data and a second frequency component higher than the first frequency component, and the first and second image encoded data correspond to the first and second frequency components, respectively.

13. The apparatus according to claim 8, wherein the plurality of types of sound data hierarchized by said sound data encoding means correspond to speech data which corresponds to a human voice and not less than two non-speech data obtained by hierarchizing non-speech data other than the speech data.

14. The apparatus according to claim 12, wherein said frame encoded data generating means groups encoded data of the speech data as sound encoded data of the most significant level together with the first image encoded data, groups encoded data of first non-speech data obtained by hierarchizing the non-speech data, as sound encoded data of a level significant next to the most significant level, together with the second image encoded data, and groups encoded data of second non-speech data other than the first non-speech data, obtained by hierarchizing the non-speech data, together with third image encoded data.

15. The apparatus according to claim 14, wherein the plurality of types of image data hierarchized by said image data encoding means contain a first frequency component obtained by a discrete wavelet transform of the image data, a second frequency component higher than the first frequency component, and a third frequency component higher than the second frequency component, and the first, second, and third image encoded data correspond to the first, second, and third frequency components, respectively.

16. The apparatus according to claim 8, wherein said frame encoded data generating means groups the image encoded data and the sound encoded data by selectively using a plurality of types of grouping methods.

17. The apparatus according to claim 16, wherein the plurality of types of grouping methods include a grouping method which gives priority to image quality and a grouping method which gives priority to sound quality.

18. The apparatus according to claim 16, further comprising:

transmitting means for transmitting the frame encoded data;

detecting means for detecting a decoding status of the transmitted frame encoded data; and control means for switching the grouping methods in accordance with the detected decoding status.

19. An encoding method of encoding frame data containing image data and sound data, comprising:

a separating step, of separating the image data and the sound data contained in the frame data;

an image data encoding step, of encoding the separated image data in sequence from a lower to a higher frequency component thereof, thereby generating image encoded data;

a sound data encoding step, of encoding the separated sound data in sequence from a lower to a higher frequency component thereof, thereby generating sound encoded data; and a frame encoded data generating step, of generating header information by using the image encoded data and the sound encoded data, and generating frame encoded data by using the header information, the image encoded data, and the sound encoded data.

20. An encoding method of encoding frame data containing image data and sound data, comprising:

a separating step, of separating the image data and the sound data contained in the frame data;

an image data encoding step, of hierarchizing the image data into a plurality of types of image data and encoding the plurality of types of image data, thereby generating image encoded data corresponding to a plurality of levels;

a sound data encoding step, of hierarchizing the sound data into a plurality of types of sound data and encoding the plurality of types of sound data, thereby generating sound encoded data corresponding to a plurality of levels; and a frame encoded data generating step, of generating frame encoded data by using the image encoded data and the sound encoded data, wherein the frame encoded data generating step includes generating the frame encoded data by forming a plurality of groups of different levels by grouping the image encoded data and sound encoded data belonging to a same level determined on the basis of a predetermined reference, and arranging the plurality of groups in descending order of significance level.

21. A program which, when executed by a computer, allows the computer to function as an encoding apparatus for encoding frame data containing image data and sound data, comprising:

code of a separating step, of separating the image data and the sound data contained in the frame data;

code of an image data encoding step, of encoding the separated image data in sequence from a lower to a higher frequency component thereof, thereby generating image encoded data;

code of a sound data encoding step, of encoding the separated sound data in sequence from a lower to a higher frequency component thereof, thereby generating sound encoded data; and code of a frame encoded data generating step, of generating header information by using the image encoded data and the sound encoded data, and generating frame encoded data by using the header information, the image encoded data, and the sound encoded data.

22. A program which, when executed by a computer, allows the computer to function as an encoding apparatus for encoding frame data containing image data and sound data, comprising:

code of a separating step, of separating the image data and the sound data contained in the frame data;

code of an image data encoding step, of hierarchizing the image data into a plurality of types of image data and encoding the plurality of types of image data, thereby generating image encoded data corresponding to a plurality of levels;

code of a sound data encoding step, of hierarchizing the sound data into a plurality of types of sound data and encoding the plurality of types of sound data, thereby generating sound encoded data corresponding to a plurality of levels; and code of a frame encoded data generating step, of generating frame encoded data by using the image encoded data and the sound encoded data, wherein the frame encoded data generating step generates the frame encoded data by forming a plurality of groups of different levels by grouping the image encoded data and sound encoded data belonging to the same level determined on the basis of a predetermined reference, and arranging the plurality of groups in descending order of significance level.

23. A recording medium recording the program according to claim 21.

24. A recording medium recording the program according to claim 22.

25. An encoding apparatus for encoding image data and sound data, comprising:

input means for inputting image data and sound data corresponding to a frame;

image data encoding means for encoding the image data inputted by said input means in sequence from a lower to a higher frequency component of the image data and generating encoded image data;

sound data encoding means for encoding the sound data inputted by said input means in sequence from a lower to a higher frequency component of the sound data and generating encoded sound data; and frame encoded data generating means for generating header information by using the encoded image data and the encoded sound data, and generating frame encoded data by using the header information, the encoded image data, and the encoded sound data.

26. An encoding apparatus for encoding image data and sound data, comprising:

input means for inputting image data and sound data corresponding to a frame;

image data encoding means for hierarchizing the image data into a plurality of types of image data and encoding the plurality of types of image data, and generating encoded image data corresponding to a plurality of levels;

sound data encoding means for hierarchizing the sound data into a plurality of types of sound data and encoding the plurality of types of sound data, and generating encoded sound data corresponding to a plurality of levels; and frame encoded data generating means for generating frame encoded data by using the encoded image data and the encoded sound data, wherein said frame encoded data generating means generates the frame encoded data by forming a plurality of groups of different levels by grouping the encoded image data and encoded sound data belonging to a same level determined on the basis of a predetermined reference, and arranging the plurality of groups in descending order of significance level.

27. An encoding method of encoding image data and sound data, comprising:

an input step, of inputting image data and sound data corresponding to a frame;

an image data encoding step, of encoding the image data in sequence from a lower to a higher frequency component of the image data and generating encoded image data;

a sound data encoding step, of encoding the sound data in sequence from a lower to a higher frequency component of the sound data and generating encoded sound data; and a frame encoded data generating step, of generating header information by using the encoded image data and the encoded sound data, and generating frame encoded data by using the header information, the encoded image data, and the encoded sound data.

28. An encoding method of encoding image data and sound data, comprising:

an input step, of inputting image data and sound data corresponding to a frame;

an image data encoding step, of hierarchizing the image data into a plurality of types of image data and encoding the plurality of types of image data, and generating encoded image data corresponding to a plurality of levels;

a sound data encoding step, of hierarchizing the sound data into a plurality of types of sound data and encoding the plurality of types of sound data, and generating encoded sound data corresponding to a plurality of levels; and a frame encoded data generating step, of generating frame encoded data by using the encoded image data and the encoded sound data, wherein in said frame encoded data generating step, the frame encoded data is generated by forming a plurality of groups of different levels by grouping the encoded image data and encoded sound data belonging to the same level determined on the basis of a predetermined reference, and the plurality of groups are arranged in descending order of significance level.

29. A program for allowing a computer to operate as an encoding apparatus for encoding image data and sound data, upon being implemented by the computer, comprising:

code of an inputting step, of inputting image data and sound data corresponding to a frame;

code of an image data encoding step, of encoding the image data in sequence from a lower to a higher frequency component of the image data and generating encoded image data;

code of a sound data encoding step, of encoding the sound data in sequence from a lower to a higher frequency component of the sound data and generating encoded sound data, and code of a generating step, of generating header information by using the encoded image data and the encoded sound data, and generating frame encoded data by using the header information, the encoded image data, and the encoded sound data.

30. A program for allowing a computer to operate as an encoding apparatus for encoding image data and sound data, upon being implemented by the computer, comprising:

code of an inputting step, of inputting image data and sound data corresponding to a frame;

code of an image data encoding step, of hierarchizing the image data into a plurality of types of image data and encoding the plurality of types of image data and generating encoded image data corresponding to a plurality of levels;

code of a sound data encoding step, of hierarchizing the sound data into a plurality of types of sound data and encoding the plurality of types of sound data and generating encoded sound data corresponding to a plurality of levels; and code of a generating step, of generating frame encoded data by using the encoded image data and the encoded sound data, wherein in said frame encoded data generating step, the frame encoded data is generated by forming a plurality of groups of different levels by grouping the encoded image data and encoded sound data belonging to a same level determined on the basis of a predetermined reference, and arranging the plurality of groups in descending order of significance level.

31. A recording medium storing the program according to claim 29.

32. A recording medium storing the program according to claim 30.

* * * * *